United States Patent
Kase et al.

(10) Patent No.: US 6,529,465 B2
(45) Date of Patent: Mar. 4, 2003

(54) OPTICAL SYSTEM FOR OPTICAL DISK DRIVE

(75) Inventors: Toshiyuki Kase, Kanagawa-ken (JP); Hiroshi Nishikawa, Saitama-ken (JP); Wataru Kubo, Saitama-ken (JP); Ryoichi Nakanishi, Saitama-ken (JP); Amit Jain, Sunnyvale, CA (US)

(73) Assignees: Pentax Corporation, Tokyo (JP); Terastor Corporation, Milpitas, CA (US)

( * ) Notice: Subject to any disclaimer, the term of this patent is extended or adjusted under 35 U.S.C. 154(b) by 0 days.

(21) Appl. No.: 09/795,458

(22) Filed: Mar. 1, 2001

(65) Prior Publication Data

US 2001/0026524 A1 Oct. 4, 2001

Related U.S. Application Data

(63) Continuation of application No. 09/105,220, filed on Jun. 26, 1998.

(30) Foreign Application Priority Data

| Jun. 26, 1997 | (JP) | 9-170267 |
| Oct. 24, 1997 | (JP) | 9-309856 |
| Oct. 24, 1997 | (JP) | 9-309860 |
| Oct. 24, 1997 | (JP) | 9-309861 |
| Nov. 4, 1997 | (JP) | 9-317628 |
| Nov. 4, 1997 | (JP) | 9-318994 |

(51) Int. Cl.$^7$ ............................................. G11B 7/00
(52) U.S. Cl. ........................ 369/112.24; 369/44.23; 369/112.23
(58) Field of Search .................. 369/44.11, 44.12, 369/44.14, 44.18, 44.17, 44.19, 44.21, 44.23, 47.1, 112.01, 112.09, 112.14, 112.21, 112.29, 119, 112.23, 112.24

(56) References Cited

U.S. PATENT DOCUMENTS

| 2,750,461 A | 6/1956 | Bunch |
| 3,244,917 A | 4/1966 | Gute |
| 3,354,833 A | 11/1967 | Laing |

(List continued on next page.)

FOREIGN PATENT DOCUMENTS

| EP | 0084727 | 8/1983 |
| EP | 0084728 | 8/1983 |
| EP | 0448362 | 9/1991 |

(List continued on next page.)

OTHER PUBLICATIONS

Patent Abstracts of Japan, vol. 012, No. 140 (P–696), dated Apr. 18, 1988.
Patent Abstracts of Japan, vol. 017, No. 505 (P–1611), dated Sep. 10, 1993.

(List continued on next page.)

*Primary Examiner*—Muhammad Edun
(74) *Attorney, Agent, or Firm*—Greenblum & Bernstein, P.L.C.

(57) ABSTRACT

Disclosed is an optical system for an optical disk drive for reading/writing data from/in an optical disk. The optical system includes a light source emitting a parallel laser beam, a deflector having a rotatable mirror surface. The parallel laser beam emitted by the light source is incident on the mirror surface of the deflector and is deflected towards an objective lens system which faces the optical disk. A relay lens system is provided between the deflector and the objective lens system such that the mirror surface and a front principal plane of the objective lens system have a substantially conjugate relationship.

14 Claims, 16 Drawing Sheets

U.S. PATENT DOCUMENTS

| | | |
|---|---|---|
| 4,088,914 A | 5/1978 | Aoki |
| 4,126,796 A | 11/1978 | Ito |
| 4,206,379 A | 6/1980 | Owda |
| 4,285,566 A | 8/1981 | Yamamoto |
| 4,297,713 A | 10/1981 | Ichikawa et al. |
| 4,351,596 A | 9/1982 | Ohniwa et al. |
| 4,466,088 A | 8/1984 | Trethewey |
| 4,688,201 A | 8/1987 | Towner et al. |
| 4,891,998 A | 1/1990 | Tourville |
| 4,959,824 A | 9/1990 | Ueda |
| 4,968,876 A | 11/1990 | Iima |
| 5,125,750 A | 6/1992 | Corle et al. |
| 5,126,899 A | 6/1992 | Kanazawa |
| 5,136,559 A | 8/1992 | Nakayama |
| 5,151,890 A | 9/1992 | Yonekubo |
| 5,220,550 A | 6/1993 | Nakayama |
| 5,254,893 A | 10/1993 | Ide |
| 5,365,504 A | 11/1994 | Noguchi |
| 5,420,848 A | 5/1995 | Date et al. |
| 5,422,872 A | 6/1995 | Hsu et al. |
| 5,444,683 A | 8/1995 | Ishikawa |
| 5,461,498 A | 10/1995 | Iwao |
| 5,517,474 A | 5/1996 | Takamine |
| 5,532,480 A | 7/1996 | Scofield |
| 5,564,585 A | 10/1996 | Saitoh |
| 5,596,446 A | 1/1997 | Plesko |
| 5,608,280 A | 3/1997 | Tamemoto et al. |
| 5,610,752 A | 3/1997 | Hayakawa |
| 5,619,488 A | 4/1997 | Ota et al. |
| 5,625,244 A | 4/1997 | Bradfield |
| 5,684,762 A | 11/1997 | Kubo |
| 5,705,868 A | 1/1998 | Cox et al. |
| 5,719,834 A | 2/1998 | Futagawa et al. |
| 5,764,613 A | 6/1998 | Yamamoto |
| 5,768,241 A | 6/1998 | Kanazawa et al. |
| 5,844,676 A | 12/1998 | Southam et al. |
| 5,886,438 A | 3/1999 | Kawanishi |
| 5,920,140 A | 7/1999 | Nakagishi et al. |

FOREIGN PATENT DOCUMENTS

| | | |
|---|---|---|
| EP | 0790512 | 8/1997 |
| EP | 0907163 | 4/1999 |
| GB | 378922 | 8/1932 |
| GB | 1314002 | 4/1973 |
| GB | 1457995 | 12/1976 |
| GB | 2000604 | 1/1979 |
| GB | 2086092 | 5/1982 |
| GB | 2193341 | 2/1988 |
| JP | 62262017 | 11/1987 |
| JP | 64-2015 | 1/1989 |
| JP | 5128561 | 5/1993 |
| JP | 8315404 | 11/1996 |
| WO | 90/08363 | 7/1990 |
| WO | 98/06095 | 2/1998 |
| WO | 98/49675 | 11/1998 |
| WO | 98/49684 | 11/1998 |

OTHER PUBLICATIONS

An article entitled "Optical Magnetic Disk Device Of U.S. TeraStor Succeeds Tracking Control—Track Pitch Of 0.34 $\mu$m Realized Using Two–Stage Servo", which appeared at pp. 13 and 14 of the Japanese Language magazine *Nikkei Electronics*, Sep. 22, 1997 (No. 699).

An article entitled "Trillions Of Bytes", by Eric Nee, which appeared in the Mar. 24, 1997 issue of Forbes magazine.

A screen capture of a page from TeraStor's website (dated Mar. 19, 1997) entitled "Architecture of TeraStor's Near–Field Technology".

An article entitled "In 1998, 10 GB Per Inch$^2$ Is Realized Using New Optical Recording Technology", appeared at pp. 148–151 of the Sep., 1997 Japanese language edition of Nikkei Byte magazine.

An article by B.D. Terris et al., entitled "Near–Field Optical Data Storage", Applied Physics Letters, vol. 68, pp. 141–143, Jan. 8, 1996.

OPTICAL SYSTEM FOR OPTICAL DISK DRIVE

CROSS-REFERENCE TO RELATED APPLICATIONS

This application is a continuation of U.S. patent application Ser. No. 09/105,220, filed Jun. 26, 1998, the contents of which are expressly incorporated by reference herein in its entirety.

BACKGROUND OF THE INVENTION

The present invention relates to an optical system to be employed in an optical disk drive to read/write data from/to an optical disk.

Recently, technology in the field of magneto-optical disk drives has been greatly improved such that a data recording density on a magneto-optical disk has reached in excess of 10 Gbits/inch$^2$.

In such an optical disk drive, an objective optical system is mounted on an arm which is movable in a transverse direction of tracks formed on an optical disk. Firstly, the rough tracking is performed by moving the arm so that a beam spot is positioned in the vicinity of the track. Then, a fine tracking is executed by changing an incident angle of a beam incident on the objective optical system so that a position of a beam spot is adjusted, with use of a galvano mirror or the like. During the fine tracking operation, the beam spot is accurately located on one of the tracks whose pitch is, for example, 0.34 μm. When the beam spot is moved on the disk surface, i.e., when the incident angle of the beam incident on the objective optical system is being changed, it is preferable that an intensity distribution of the beam does not vary. In other words, during the fine tracking, it is preferable that a coupling efficiency between the objective optical system and a light source applicable to the optical disk drive does not vary.

SUMMARY OF THE INVENTION

It is therefore an object of the invention to provide an improved optical system, which is applicable to an optical disk drive having a rotatable deflection system, and allows a relatively great degree of freedom in designing the rotatable deflection system.

For the above object, according to an aspect of the invention, there is provided an optical system for an optical disk drive for reading/writing data from/in an optical disk, the optical system comprising: a light source emitting a parallel laser beam; a deflector having a rotatable mirror surface, the parallel laser beam emitted by the light source being incident on the mirror surface and is deflected; an objective lens system facing the optical disk; and a relay lens system provided between the deflector and the objective lens system such that the mirror surface and a front principal plane of the objective lens system have a substantially conjugate relationship.

Since the relay lens system is arranged between the deflector, or a galvano mirror and the objective lens, and the reflection surface of the galvano mirror and the front principal plane of the objective lens have the conjugate relationship, even if the galvano mirror is rotated, it is ensured that the light beam reflected by the galvano mirror is incident substantially on a same portion of the objective lens, incident angle being changed depending on the rotation angle of the galvano mirror.

In one example, the relay lens system may include a single positive lens group having a positive power, the single positive lens group making a vicinity of the mirror and the front principal plane of the objective lens to have in the substantially conjugate relationship.

In particular, the light source may include a laser diode which emits a diverging laser beam having an elliptical cross section; a collimator lens which converts said diverging laser beam emitted by said laser diode into a parallel beam having an elliptical cross section; and a beam shaping prism which converts said parallel beam having said elliptical cross section into a parallel beam having a circular cross section.

Optionally, the single positive lens group may consist of a single positive lens.

Alternatively, the single positive lens group may have a plurality of lenses arranged such that at least a chromatic aberration of the objective lens is compensated.

In this case, the single positive lens group may have a single cemented lens which are composed of the plurality of lenses.

Alternatively, the single positive lens group may have a telephoto type lens group.

In another example, the relay lens system may have a first and second relay lens groups, the first and second relay lens groups being arranged such that a front focal point of the first relay lens group is located on a vicinity of a central portion of the mirror surface on which the laser beam is incident, that a rear focal point of the first relay lens group coincides with a front focal point of the second relay lens group, and that a rear focal point of the second relay lens group coincides with a front principal point of the objective lens.

In this case, a focal length of the first relay lens group may be equal to a focal length of the second relay lens group. Alternatively, a focal length of the first relay lens group is greater, or smaller than a focal length of the second relay lens group.

Optionally, at least one of the first and second relay lens groups may be constituted to compensate a chromatic aberration of the objective lens.

In particular, at least one of the first and second relay lens groups may have a cemented lens which is composed of a plurality of lenses adhered with each other.

Further optionally, at least one of the first and second relay lens groups may consist of a telephoto type lens system.

Optionally, the optical system may include a cylindrical lens provided between the light source and the galvano mirror, the cylindrical lens converges the parallel beam on the reflection surface of the galvano mirror in a direction parallel to a rotary axis of the galvano mirror so that a line-like image is formed on the reflection surface of the galvano mirror, and the relay lens system is constituted such that a parallel beam is emerged from the relay lens system when the line-like image is reflected by the reflection surface of the galvano mirror and is incident on the relay lens system.

In particular, the relay lens system may include an anamorphic surface.

In this case, the relay lens system may include a first and a second relay lens groups, the first relay lens group has different power in a direction parallel to the rotary axis of the galvano mirror and in a direction perpendicular to the rotary axis of the galvano mirror, the first and second relay lens groups being arranged such that the beam reflected by the reflection surface of the galvano mirror is converged at a focal point of the second relay lens group, and that a rear focal point of the second relay lens group coincides with a front principal point of the objective lens.

According to another aspect of the invention, there is provided an optical system for an optical disk drive for reading/writing data from/in an optical disk, the optical system comprising: a light source emitting a diverging light from a light emitting point; a deflector having a rotatable mirror surface, the light emitted by the light source being incident on the mirror surface and is deflected; an objective lens system facing the optical disk; and a relay lens system provided between the deflector and the objective lens system such that the mirror surface and a front principal plane of the objective lens system have a substantially conjugate relationship.

In this case, the relay lens system may have a first and second relay lens groups which are arranged to satisfy relationship below:

$$1/f1=1/D1+1/D2;$$

and $$f1<D1,$$

where, D1 is a distance between the light emitting point and a front principal point of the first lens group, f1 is a focal length of the first lens group, and D2 is a distance between a rear principal point of the first lens group and a front focal point of the second lens group.

DESCRIPTION OF THE ACCOMPANYING DRAWINGS

DESCRIPTION OF THE EMBODIMENTS

Hereinafter, the invention will be described with reference to the accompanying drawings.

Firstly, an optical disk drive to which the each of the embodiments is applicable will be described.

Figure 1:
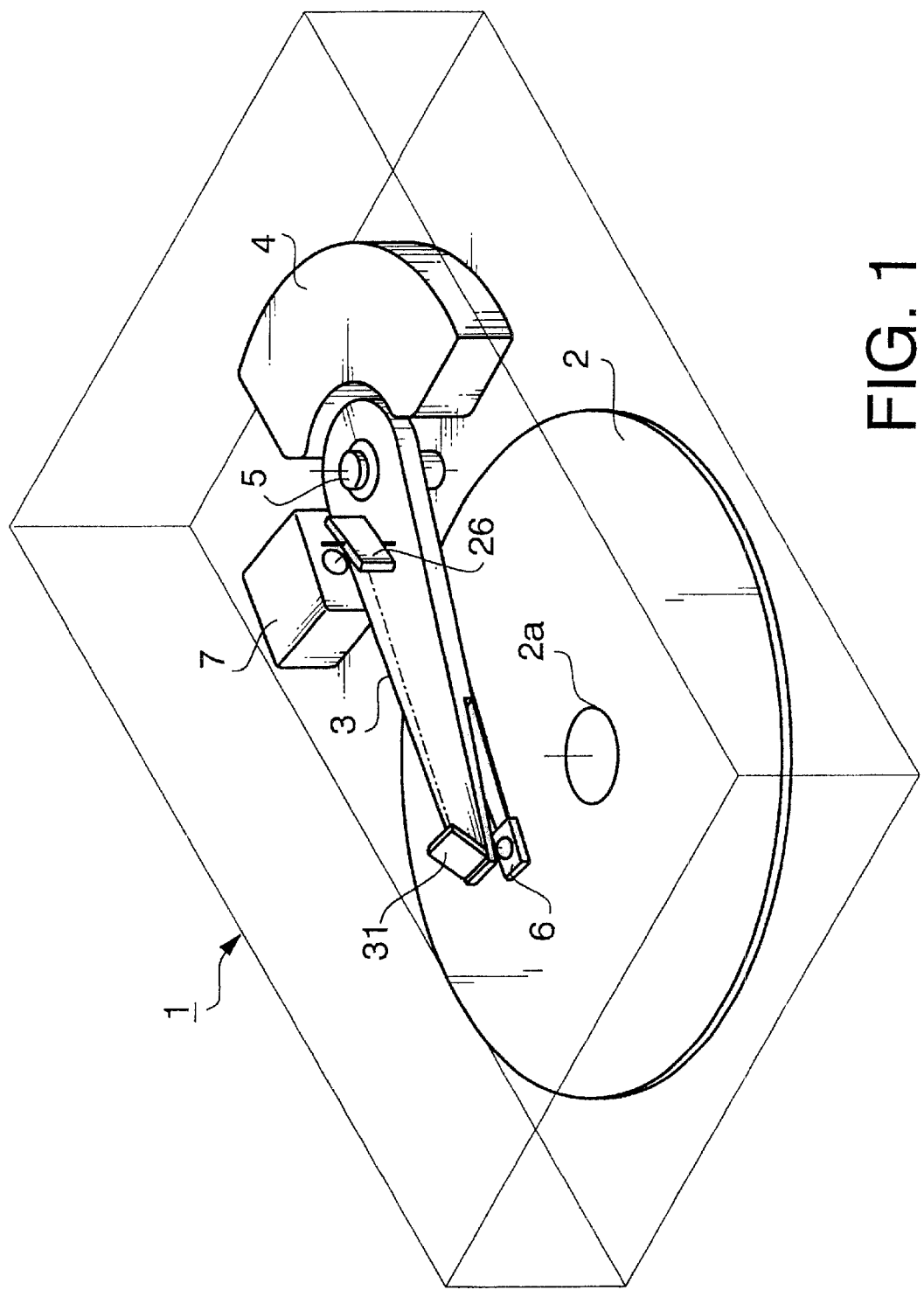
FIG. 1 is a perspective view of an optical disk drive to which first and the second embodiments of the present invention is embodied.

FIG. 1 is a perspective view of the optical disk drive (hereinafter, referred to as the disk drive) 1. The disk drive 1 is arranged to write and read data on an optical disk 2 by means of a so-called Near Field Recording (NFR) technology.

In the disk drive 1, the optical disk 2 is mounted to a rotating shaft 2a of a not-shown spindle motor. The disk drive 1 includes a rotary arm 3 extending in parallel to a surface of the optical disk 2, and is rotatably supported by a shaft 5. A floating head 6 that carries optical elements (described later) is provided to a tip of the rotary arm 3. When the rotary arm 3 is rotated, the floating head 6 moves across tracks formed on the optical disk 2. The rotary arm 3 is further provided with a light source module 7 in the vicinity of the shaft 5.

Figure 2:
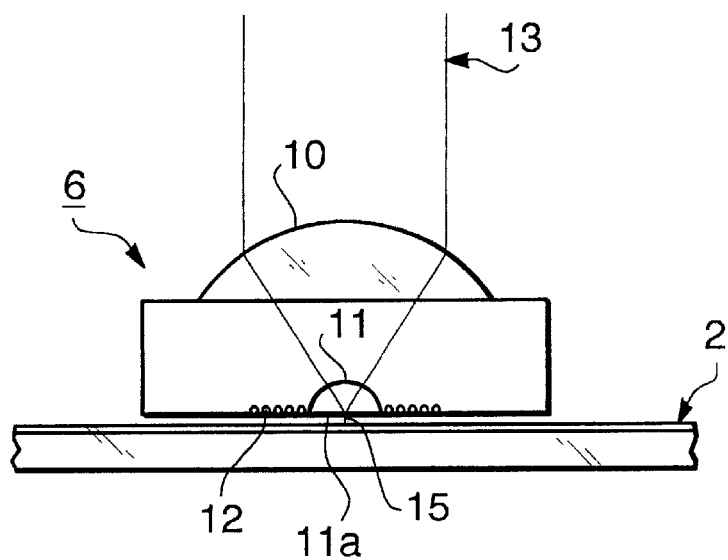
FIG. 2 is an enlarged view of a floating head of the optical disk drive of FIG. 1.
Figure 3:
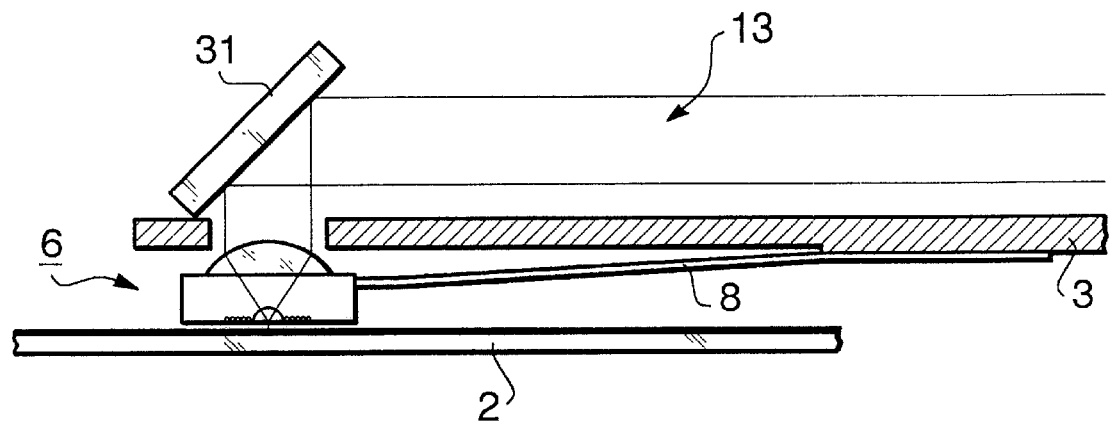
FIG. 3 is an enlarged view of the tip of the rotary arm of the optical disk drive of FIG. 1.

FIG. 2 is an enlarged view of the floating head 6. FIG. 3 is an enlarged view of the tip of the rotary arm 3. As shown in FIG. 3, the floating head 6 is mounted to the rotary arm 3 via a flexure beam 8. One end of the flexure beam 8 is fixed to the bottom of the rotary arm 3, while the floating head 6 is fixed to the other end of the flexure beam 8. When the optical disk 2 rotates, the floating head 6 is lifted upward by air flow generated between the spinning optical disk 2 and the floating head 6. When the floating head 6 is lifted upward, the flexure beam 8 is elastically deformed, which urges the floating head 6 downward. With this, the floating amount of the floating head 6 is kept constant, due to the balance of the upward force (caused by the air flow) and the downward force (caused by the deformation of the flexure beam 8).

As shown in FIG. 2, the floating head 6 includes an objective lens 10 and a solid immersion lens (SIL) 11. A reflecting mirror 31 is provided to the rotary arm 3, which reflects the laser beam 13 emitted from the light source module 7 (FIG. 4) to the objective lens 10. The objective lens 10 converges the laser beam 13. The solid immersion lens 11 is a hemispherical lens and the plane surface thereof is faced with the optical disk 2. Further, the focal point of the objective lens 10 is positioned on the plane surface of the solid immersion lens 11. That is, the laser beam 13 is converged on the plane surface 11a of the solid immersion lens 11. Since the clearance of the optical disk and the plane surface 11a of the solid immersion lens 11 is less than 1 μm, the converged laser beam is converted to a so-called evanescent beam and reaches the optical disk 2. Since the beam diameter of the evanescent beam is smaller than the converged laser beam, a data storage capacity can be remarkably increased. Application of the solid immersion lens and the evanescent beam in a data recording device is disclosed in B. D. Terris, H. J. Manin, and D. Rugar, "Near-field optical data storage", Appl. Phys. Lett. 68, 141–143 (1996), and U.S. Pat. No. 5,125,750 issued on Jun. 30, 1992, teachings of which are incorporated by reference in their entireties.

In order to apply magnetic field on the surface of the optical disk 2, a coil 12 is provided around the solid immersion lens 11. A current flow in the coil 12 generates a magnetic field in which the optical disk 2 is positioned. Data writing is performed by the evanescent beam from the solid immersion lens 11 and the magnetic field generated by the coil 12.

Figure 4:
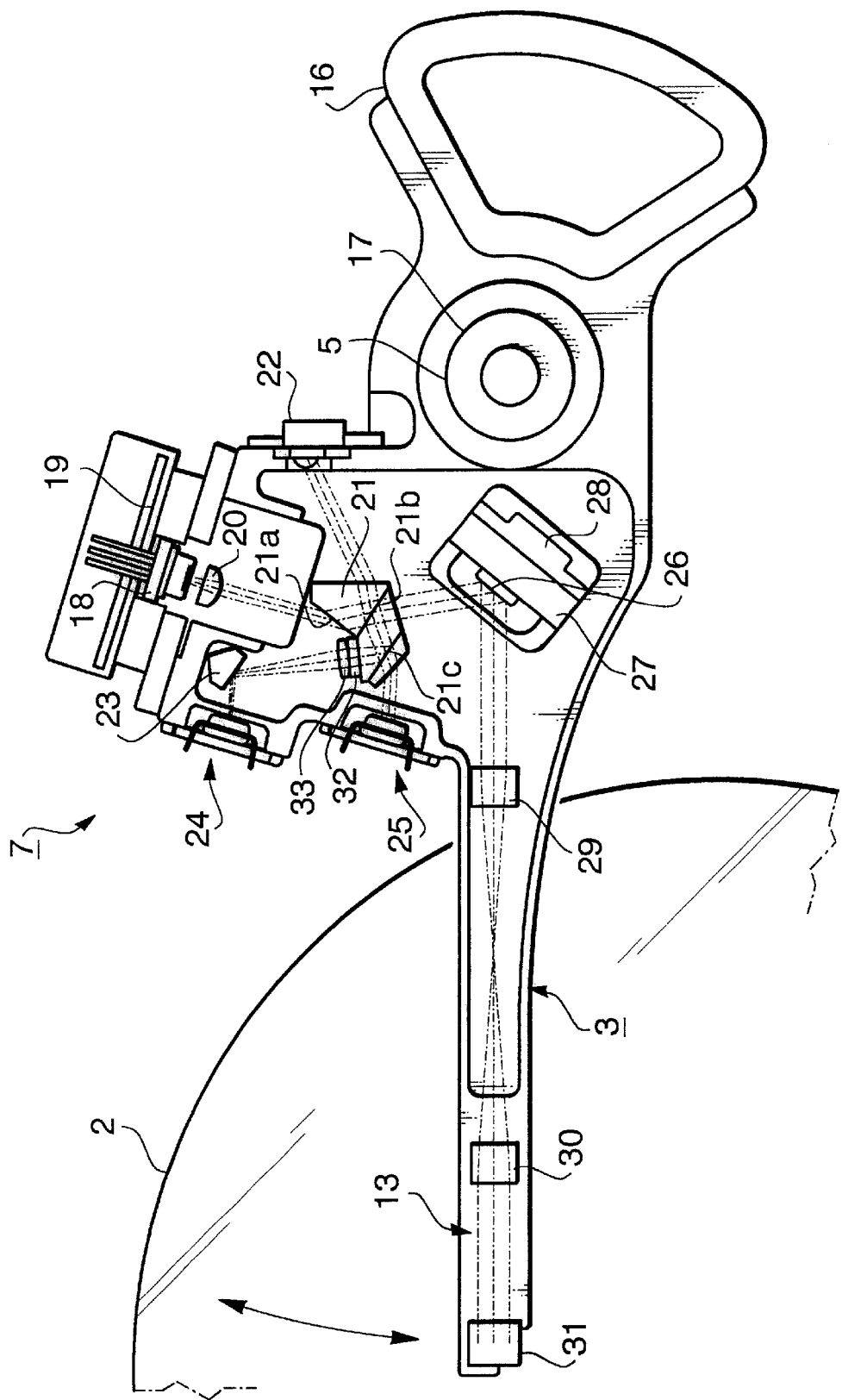
FIG. 4 is a top view of the rotary arm of the optical disk drive of FIG. 1.
Figure 5:
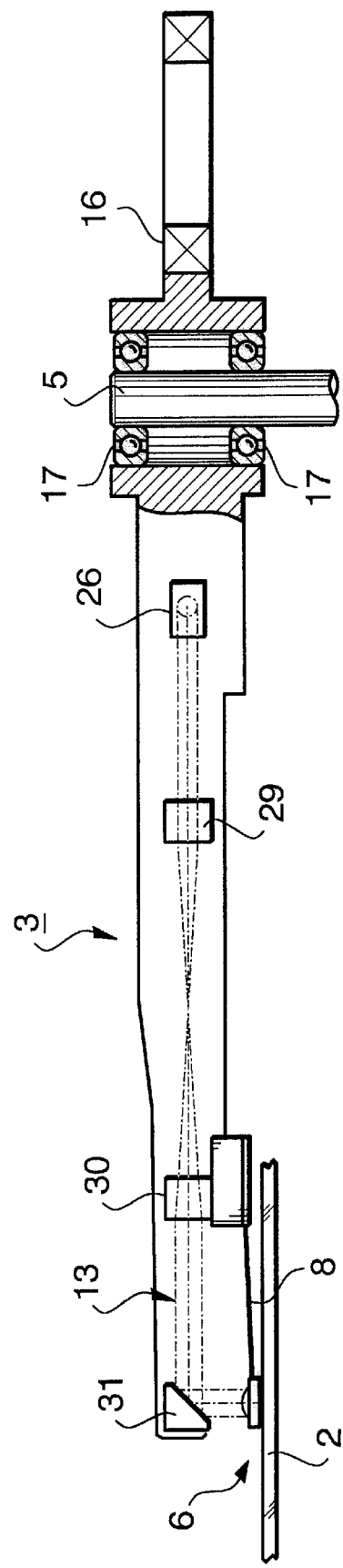
FIG. 5 is a longitudinal sectional view of the rotary arm of the optical disk drive of FIG. 1.

FIGS. 4 and 5 are a plan view and a sectional view of the rotary arm 3. As shown in FIGS. 4 and 5, the rotary arm 3 is provided with a driving coil 16 at the opposite end to the floating head 6. The driving coil 16 is inserted into a not shown magnetic circuit. The driving coil 16 and the magnetic circuit constitute a voice coil motor 4 (FIG. 1). The rotary arm 3 is supported by the shaft 5 via bearings 17. When current flows in the driving coil 16, the rotary arm 3 is rotated about the axis 5, due to the electromagnetic induction.

As shown in FIGS. 4 and 5, the light source module 7 includes a semiconductor laser 18, a laser drive circuit 19, a collimator lens 20 and a composite prism assembly 21. Further, the light source module 7 includes a laser power monitor sensor 22, a reflection prism 23, a data sensor 24 and a tracking detection sensor 25. A divergent laser beam emitted from the semiconductor laser 18 is converted to a parallel laser beam by the collimator lens 20. Due to the characteristics of the semiconductor laser 18, the sectional shape of the laser beam is elongated. In order to correct the sectional shape of the laser beam, an incident surface 21a of the composite prism assembly 21 is inclined with respect to the incident laser beam. When the laser beam is refracted by the incident surface 21a of the composite prism assembly 21, the sectional shape of the laser beam becomes a circle. The laser beam enters a first half mirror surface 21b. By the first half mirror surface 21b, the laser beam is partially lead to the laser power monitor sensor 22. The laser power monitor sensor 22 detects the intensity of the incident laser beam. The output from the laser power monitor sensor 22 is sent to a power control circuit (not shown) so as to stabilize the power of the semiconductor laser 18.

The tracking operation includes two steps: (1) a rough tracking and (2) a fine tracking. The rough tracking is accomplished by the rotation of the rotary arm 3. The fine tracking operation is accomplished by minutely moving the light spot on the optical disk 2. For this purpose, a galvano mirror 26 is provided in a light path between the light source module 7 and the objective lens 10. In particular, the galvano mirror 26 is locate so that the laser beam 13 emitted from the light source module 7 directly enters therein. The laser beam 13 reflected by the galvano mirror 26 proceeds to the reflection mirror 31 and is reflected (by the reflection mirror 31) to the floating head 6. Then, the laser beam 13 is converged and incident on the optical disk 2. By rotating the galvano mirror 26, the incident angle of the laser beam 13 incident on the objective lens 10 is changed, so that the light spot on the optical disk 2 is moved. The rotating angle of the galvano mirror 26 is detected by a galvano mirror positioning sensor 28 located in the vicinity of the galvano mirror 26.

When the galvano mirror 26 rotates to change the incident angle of the laser beam 13 incident on the objective lens 10, there is a possibility that the laser beam 13 partially fails to enter the objective lens 10. In order to solve this problem, first and second relay lenses 29 and 30 are provided between the galvano mirror 26 and the objective lens 10 to obtain the conjugate relationship between a principal plane of the objective lens 10 and the center of the mirror surface of the galvano mirror 26 (in the vicinity of the rotation axis thereof). With this, the laser beam 13 reflected by the galvano mirror 26 is surely incident on the objective lens 10 irrespective of the rotation of the galvano mirror 26.

The laser beam 13 that has returned from the surface of the optical disk 2 travels through the floating head 6, the relay lenses 30 and 29 and the galvano mirror 26. Then, the laser beam 13 enters the composite prism assembly 21 and is reflected by the first half mirror surface 21b to the second half mirror surface 21c. The laser beam passed through the second half mirror surface 21c is directed to the tracking detection sensor 25. The tracking detection sensor 25 outputs a track error signal based on the incident laser beam. The laser beam that as reflected by the second half mirror surface 21c is split by a Wollaston polarizing prism 32, generating two polarized beams. The polarized beams are converged (by a converging lens 33) on the data detection sensor 24 via the reflection prism 23. The data detection sensor 24 has two light receiving portions which respectively receives two polarized beams. With this, the data detection sensor 24 reads data recorded on the optical disk 2. In particular, the data signal from the tracking detection sensor 25 and data detection sensor 24 are generated by a not-shown amplifier circuit and sent to a not-shown control circuit.

Hereinafter, optical systems according to embodiments of the present invention will be described. For simplifying the drawings and description, the optical path is partially developed and the reflection mirror 31 and SIL 12 are omitted in the drawing. In each embodiment, a relay lens system is provided between the galvano mirror 26 and the objective lens 10, and various modifications of the relay lens system will be described as distinct embodiments.

[First Embodiment]

Figure 6:
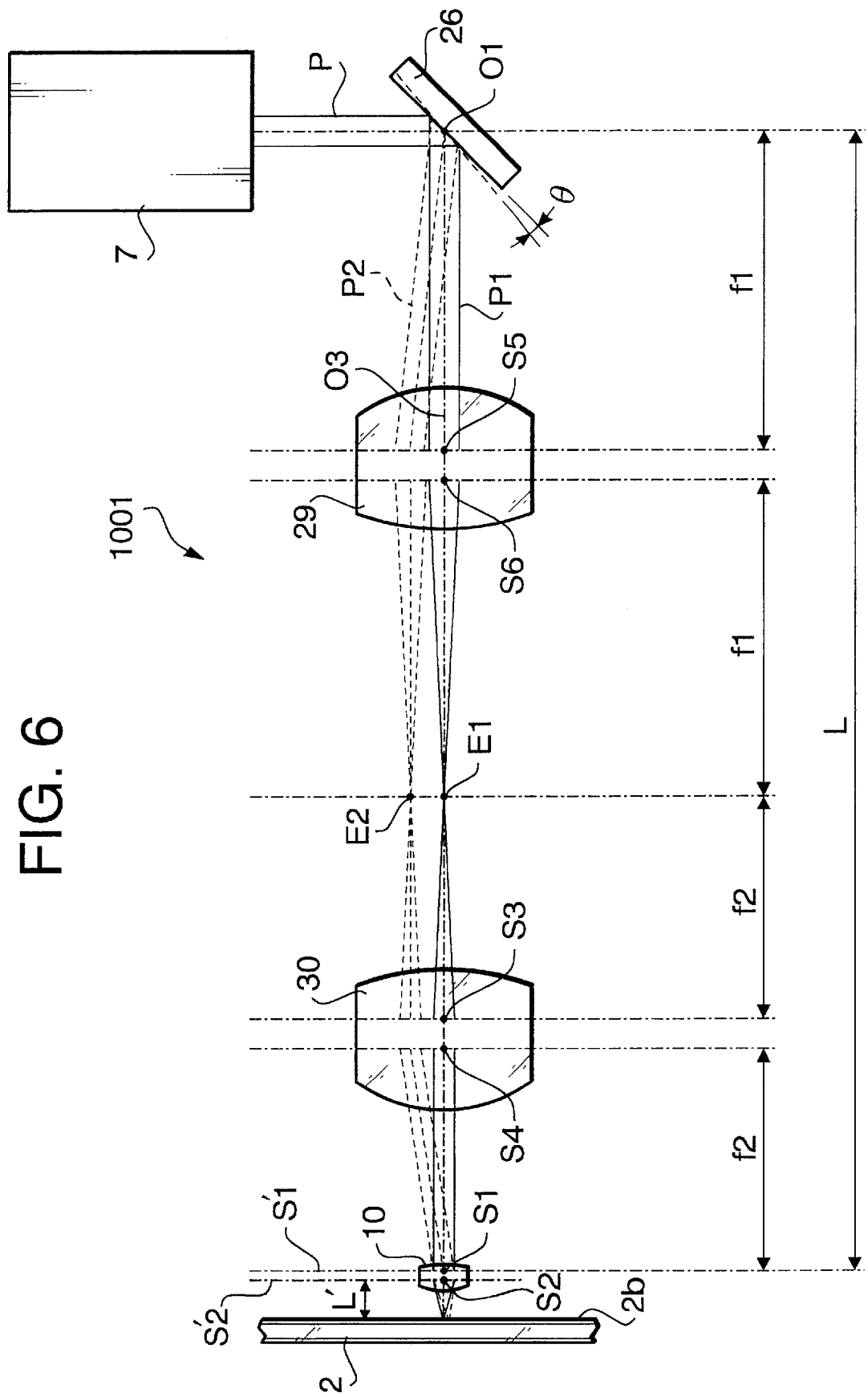
FIG. 6 shows an arrangement of optical elements of an optical system according to a first embodiment of the invention.

FIG. 6 schematically shows, in developed form, a structure of the optical system 1001 according to a first embodiment of the invention. The optical system 1001 can be employed in the disk drive 1 described above.

The optical system 1001 shown in FIG. 6 includes a relay lens system including a pair of relay lenses 29 and 30. Focal lengths of the first and second relay lenses 29 and 30 are f1 and f2, respectively. The first relay lens 29 is positioned such that a front focal point thereof substantially coincides with a central portion of a reflection surface of the galvano mirror 26. The second relay lens 30 is arranged such that a front focal point thereof substantially coincides with a rear focal point of the first relay lens 29, and a rear focal point of the second relay lens 30 coincides with a front principal point S1 of objective lens 10.

The relay lens 29 has front and rear principal points S3 and S4, and the relay lens 30 has front and rear principal points S5 and S6. In the first embodiment, the first and second relay lenses 29 and 30 are the same type of lenses and have the same focal length (i.e., f1=f2). It should be noted that lenses having different focal lengths may be used, and such optical systems will be described later as other embodiments.

As shown in FIG. 6, a parallel laser beam P emitted by the light source module 7 is incident on the galvano mirror 26, and reflected thereby towards the first relay lens 29. In FIG. 6, a path of the laser beam P1 when the galvano mirror 26 is positioned at a standard position, at which the incident angle of the laser beam P is 45 degrees, is indicated by solid lines, and the path of the laser beam P2 when the galvano mirror 26 has been rotated by angle $\theta$ from the standard position is indicated by broken lines.

When the galvano mirror 26 is at the standard position, the center of the laser beam P1 at which the light intensity distribution has the maximum value intersects the principal point S5 of the first relay lens 29. In this case, the light path of the laser beam P1 is parallel to an optical axis O3 of the first relay lens 29. The parallel laser beam P1 passed through the first relay lens 29 is converged onto a point E1 which coincides with the focal point of the first relay lens 29, and then incident on the second relay lens 30 as a diverging beam. The point E1 also coincides with the front focal point of the relay lens 30, and accordingly the diverging beam incident on the relay lens 30 is emerged from the first relay lens 29 as a parallel laser beam. The parallel laser beam emerged from the second relay lens 30 is directed to the objective lens 10 via the reflection mirror 31 (see FIG. 1).

The objective lens 10 has a front principal point S1 and a rear principal point S2, and converges the incident parallel light beam onto a data recording surface 2b to form a light spot thereon. The distance L between the center O1 of rotation of the galvano mirror 26 and the front principal point S1 of the objective lens 26 is fixed.

When the galvano mirror 26 has been rotated by a predetermined angle $\theta$ from the standard position, the center of the light intensity distribution of the parallel laser beam P2 does not coincide with the principal point S3 of the second relay lens 29. In this case, the parallel laser beam P2 proceeds, in an inclined manner, with respect to the optical axis O3 of the relay lens 29. This parallel laser beam P2 is converged on a position E2 by the relay lens 29, and then incident on the relay lens 30 as a diverging beam. Since the first relay lens 29 and the second relay lens 30 are arranged such that the focal point of the first relay lens 29 and the front focal point of the second relay lens 39 coincide with each other, the laser beam P2 that emerged from the relay lens 30 will become a parallel laser beam again, and is directed to the objective lens 10. When the laser beam P2 is incident on the front principal plane S'1 of the objective lens 10, the center of the light beam P2, at which the light intensity distribution has the maximum value, intersects the front principal point S1 of the objective lens 10.

Since the center of the parallel laser beam, at which its light intensity distribution is the greatest, always intersects the front principal point S1 of the objective lens 10 regardless of the rotation angle of the galvano mirror 26, and only the incident angle of the laser beam, which is incident on the objective lens 10, changes, a light spot can be formed on the data recording surface 2a without lowering the coupling efficiency between the light source module 7 and the objective lens 10 and without causing biasing of the light intensity distribution with respect to the principal point S1, and therefore the fine tracking can be performed accurately.

[Second Embodiment]

Figure 7:
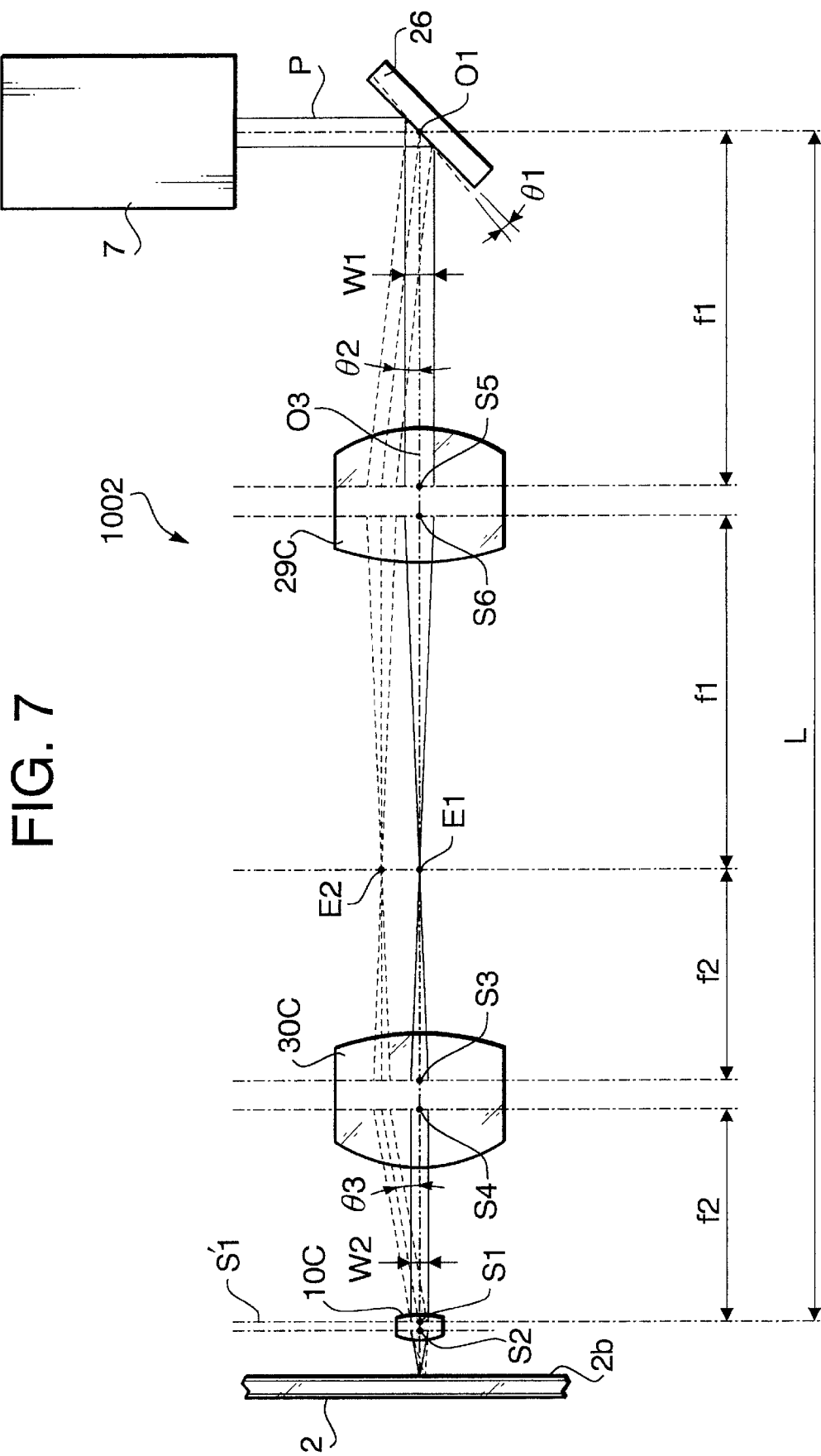
FIG. 7 shows an arrangement of optical elements of an optical system according to a second embodiment of the invention.

FIG. 7 shows an optical system 1002 according to a second embodiment of the invention.

The second embodiment is similar to the first embodiment except that a first and a second relay lenses 29C and 30C having different focal lengths are employed.

Specifically, the focal lengths f1 and f2 of the above-described first and second relay lenses 29C and 30C satisfy the relationship, f1>f2>0.

As described above, the distance between the principal plane S5 of the first relay lens 29C and the rotation center O1 of the galvano mirror 26 is equal to the focal length f1 of the first relay lens 29C. The distance between a rear (i.e., the objective lens side) principal point S6 of the first relay lens 29C and a front (i.e., the galvano mirror side) principal point S3 of the second relay lens 30C is f1+f2. Further, the distance between the a rear (i.e., objective lens side) principal point S4 of the second relay lens 30C and the front principal point S1 of the objective lens 10 is equal to the focal length f2 of the second relay lens 30C. In other words, the vicinity of the rotation center O1 of the galvano mirror 26 and principal point S1 of objective lens 10 are substantially in a conjugate relationship.

In FIG. 7, relationship between the rotation angle $\theta 1$ of the galvano mirror 26 with respect to its reference position, and the angle $\theta 2$ of the parallel beam P2 reflected by the galvano mirror 26 with respect to the optical axis O3 is given by $\theta 2 = \theta 1 \times 2$, and the rotation directions of the galvano mirror 26 and the parallel beam are the same. Also, the relationship between the angle of incidence $\theta 3$ of the beam P2 with respect to the principal plane S'1 of the objective lens 10 and the angle $\theta 2$ is given by an equation, $\theta 3 = \theta 2 \times f1/f2$. Since f1>f2>0, (f1/f2)>1. Thus, $\theta 3 > \theta 2$ and $\theta 3 = 2 \times \theta 1 \times f1/f2$, where, $\theta 2$ and $\theta 3$ are opposite in direction. In this second embodiment, the relationship between a diameter W1 of the beam incident on the first relay lens 29C and a diameter W2 of the beam that is emerged from the second relay lens 30C is expressed as $W2 = W1 \times f2/f1$. Since f1>f2>0, f2/f1<1 and accordingly W2<W1.

Thus, with the disk drive employing the optical system 1002 described above, lowering of coupling efficiency between the light source module 7 and the objective lens 10 is suppressed by disposing the relay lens system including the first and second relay lenses 29C and 30C, between the galvano mirror 26 and the objective lens 10.

Further, in the second embodiment, since the focal length f1 of the first relay lens 29C is greater than the focal length f2 of the second relay lens 30C, the angle of incidence of the light beam on the front principal plane (entrance pupil) of the objective lens 10 can be varied greatly with respect to the deflection angle of the galvano mirror 26. That is, the angle of incidence of the light beam on the principal plane of the objective lens 10 can be varied by a large amount even if the rotation angle of the galvano mirror 26 is relatively small.

Further, since the beam diameter of the beam that is incident on the objective lens 10 can be made small with respect to the diameter of the beam incident on the relay lenses 29C, the floating head 6, which includes the objective lens 10, can be made compact and lightweight and accordingly the rotary arm 3 can also be made lightweight and moment of inertia thereof can be lowered.

[Third Embodiment]

Figure 8:
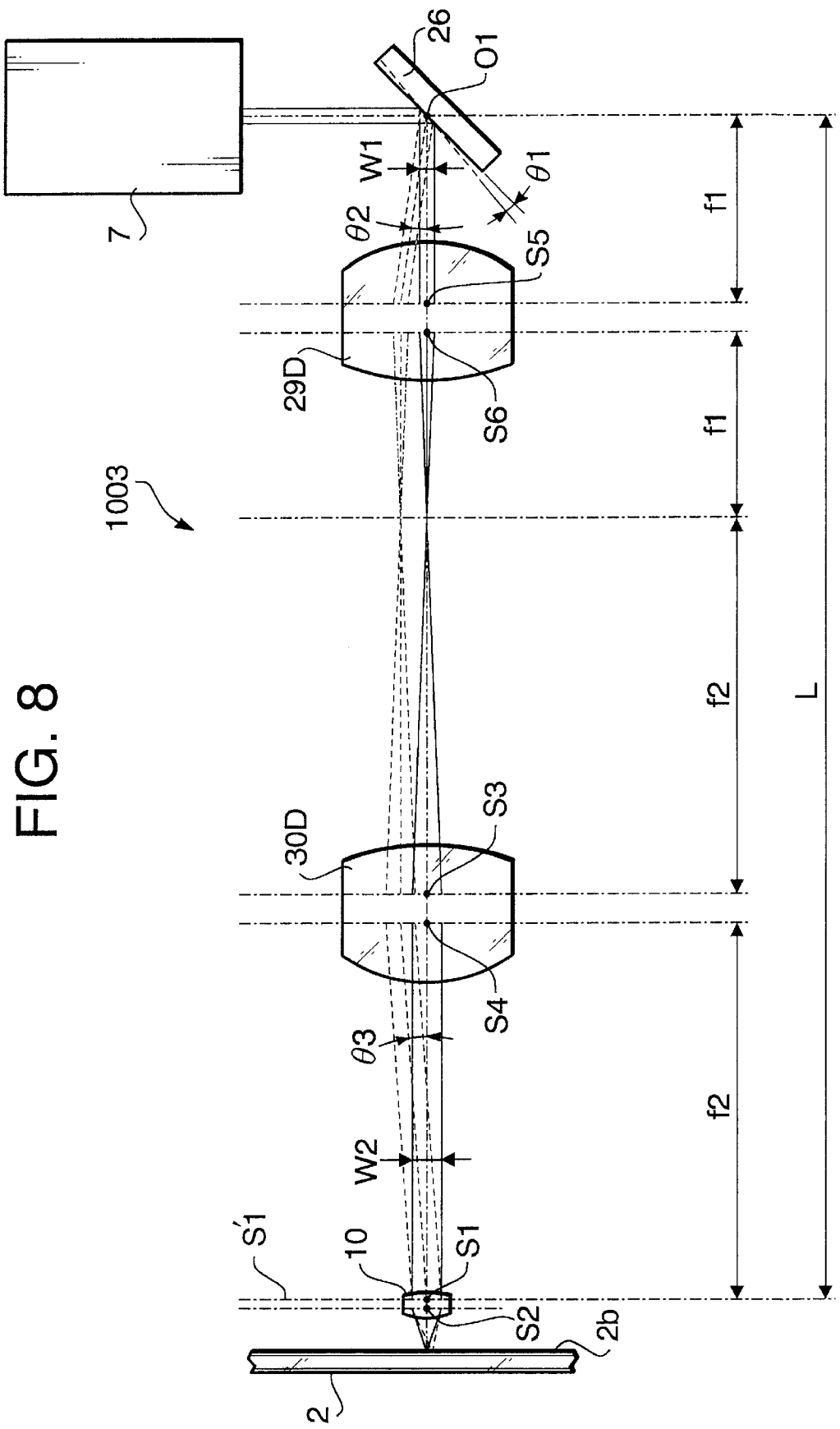
FIG. 8 shows an arrangement of optical elements of an optical system according to a third embodiment of the invention.

FIG. 8 shows an optical system 1003 according to a third embodiment of the invention.

The optical system 1003 according to the third embodiment is similar to the optical system 1002 according to the second embodiment except that a focal length f1 of a first relay lens 29D is smaller than a focal length f2 of a second relay lenses 30D.

In this case, the relationship between the angle of incidence $\theta 3$ of the beam with respect to the principal plane S1 of the objective lens 10 and the angle θ2 is given by θ3=θ2×f1/f2. Since f2>f1>0, 0<(f1/f2)<1. Thus, θ2>θ3 and θ3=2×θ1×f1/f2, where, θ2 and θ3 are opposite in direction. In this third embodiment, the relationship between a diameter W1 of the beam incident on the first relay lens 29D and a diameter W2 of the beam that is emerged from the second relay lens 30D is expressed as W2=W1×f2/f1. Since f2>f1>0,f2/f1>1 and accordingly W2>W1.

Thus, with the arrangement of the optical system 1003 according to the third embodiment, the diameter of the beam incident on the relay optical system 1003 can be made small with respect to the diameter of the beam that is incident on the objective lens 10 and thereby the incident side optical system can be made lightweight and reduced in size. In particular, since the diameter of the beam that is incident on the galvano mirror 26 is small compared to the diameter of the beam that is incident on the objective lens 10, the effective area (i.e., an area of the deflection surface) of the galvano mirror 26 can be made small, and the response of the galvano mirror 26 to a driving force can thus be improved.

[Fourth Embodiment]

Figure 9:
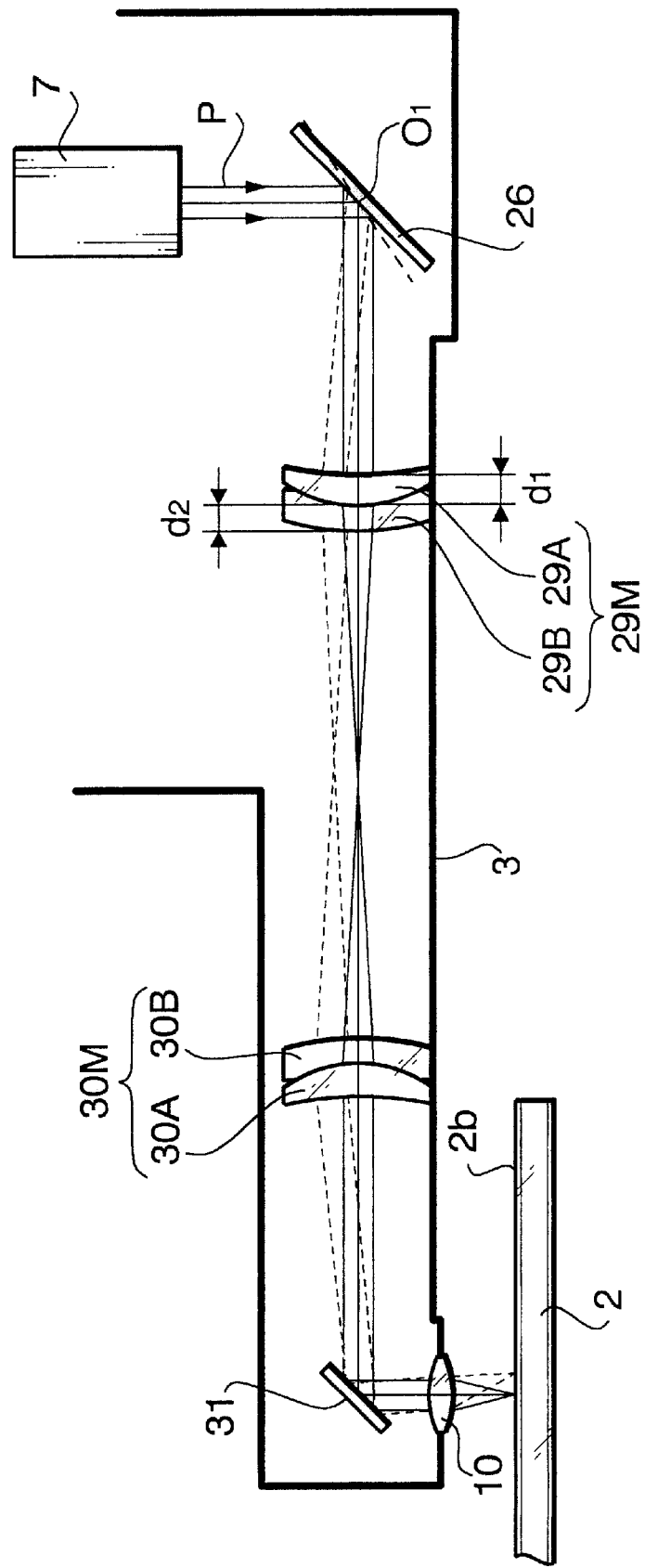
FIG. 9 shows an arrangement of optical elements of an optical system according to a fourth embodiment of the invention.

FIG. 9 shows an optical system 1004 according to a fourth embodiment of the invention. The optical system 1004 is a modification of the first embodiment, wherein the relay lens system is configured to compensate a chromatic aberration of the objective lens 10.

In the optical system 1001 using the relay lenses shown in FIG. 6, the first and the second relay lenses 29 and 30 have, for example, the same focal length of f1=f2=15 mm, and are made from glass material LaF81, while the objective lens 10 has a focal length of f=1.23 mm and is made from glass material NbFD82.

Generally, the wavelength of the laser beam P emitted from the laser diode 18 may vary by 2 to 3 nm between reading and writing data, the focal length of the objective lens 10 will vary by 0.24 μm to 0.36 μm.

For example, when the wavelength of the laser beam P emitted from laser diode 18 changes by 1 nanometer (nm), the focal length of the objective lens 10 changes by approximately 0.10 μm. That is, a chromatic aberration of 0.10 μm/nm will occur.

If a distance L' between the data recording surface 2b and the objective lens 10 is 1 μm or less, the laser beam does not focus on the data recording surface 2b due to the chromatic aberration of the objective lens 10, which cannot be ignored.

To compensate the chromatic aberration due to variation of the wavelength, according to the fourth embodiment, first and second relay lenses 29M and 30M which are respectively constituted as a cemented lens by adhering two lenses 29A and 29B, and 30A and 30B as shown in FIG. 9 are employed.

Specifically, in the optical system 1004 shown in FIG. 9, the first relay lens 29M is constituted such that:

PSKO2 is used as glass material of the lens 29A;
SF7 is used as glass material of the lens 29B;
a focal length of the entire lens 29M is 15 mm;
R1=−16.5 mm;
R2=−0.95 mm;
R3=−5.5 mm;
d1=2.0 mm; and
d2=1.0 mm, wherein R1 represents the radius of curvature of the galvano mirror side surface of the lens 29A, R2 represents the radius of curvature of the adhered surfaces of lenses 29A and 29B, R3 represents the radius of curvature of the objective lens side surface of the lens 29B, d1 indicates the thickness of the lens 29A along the optical axis thereof, and d2 indicates the thickness of the lens 29B along the optical axis of the lens 29B. Thus configured relay lens 29M is capable of compensating the chromatic aberration of the objective lens 10 to 0.02 μm/nm. In other words, after compensation is performed, chromatic aberration of 0.02 μm/nm remains. The same lens as the relay lens 29M is used as the second relay lens 30M. It should be noted that it may be possible to constituted only one of the first and second relay lenses to compensate the chromatic aberration of the objective lens 10.

[Fifth Embodiment]

Figure 10:
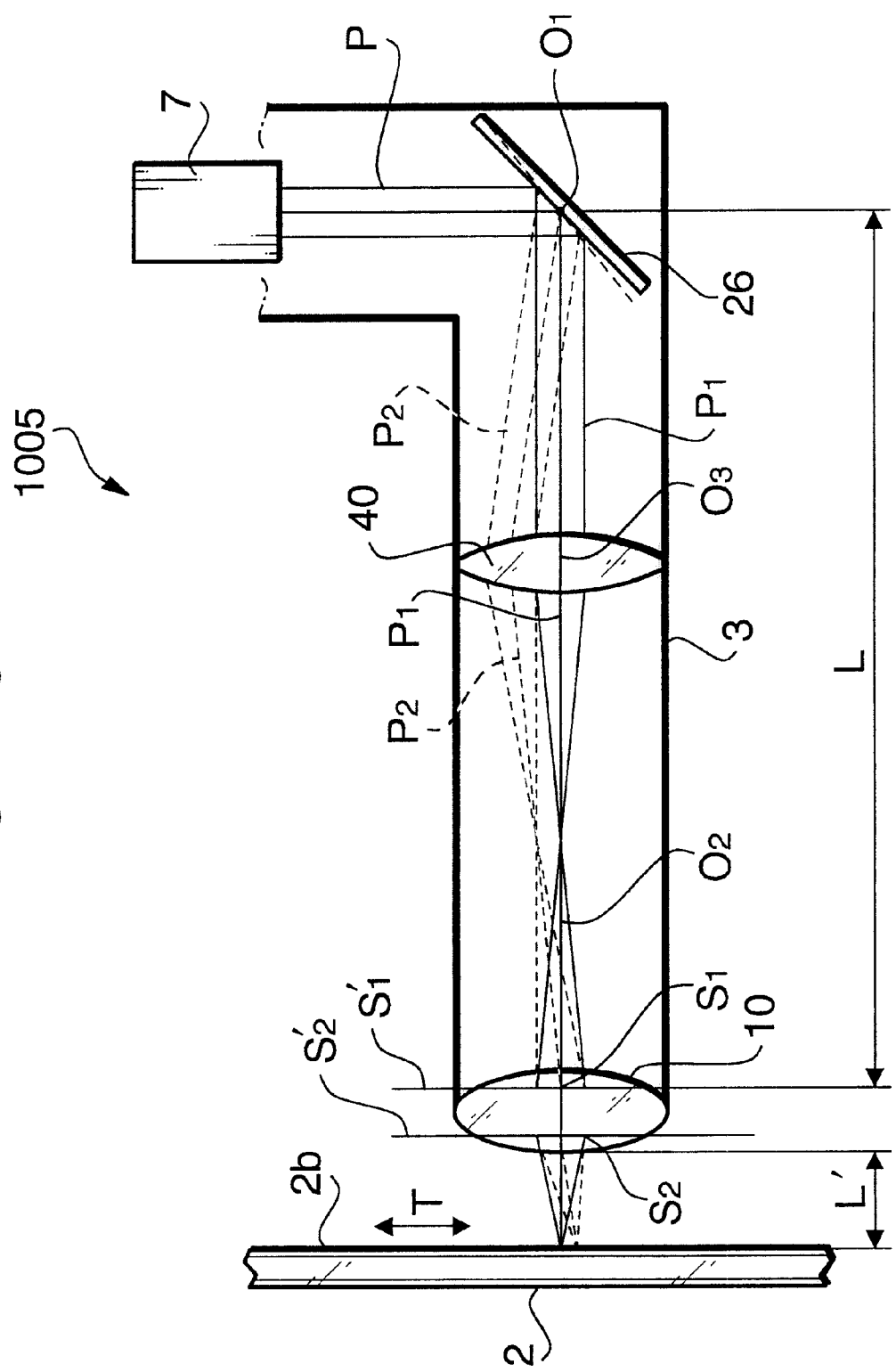
FIG. 10 shows an arrangement of optical elements of an optical system according to a fifth embodiment of the invention.

FIG. 10 shows an optical system 1005 according to a fifth embodiment of the invention. According to the fifth embodiment, a single lens is provided as a relay lens system between the galvano mirror 26 and the objective lens 10. As shown in FIG. 10, the optical system 1005 has a relay lens 40 which is disposed between the rotation center O1 of the galvano mirror 26 and the objective lens 10.

The relay lens 40 is arranged such that a central portion of a reflection surface of the galvano mirror and the front principal point S1 have a substantially conjugate relationship. The relay lens 40 forms the image of the central portion of the reflection surface of the galvano mirror 26 on the front principal plane S'1, which includes the front principal point S1, of the objective lens 10. The parallel laser beam P that is emitted by the laser light source 7 and is deflected by the galvano mirror 26 is once converged by the relay lens 40, and then directed to the objective lens 10 via the reflecting mirror 31 as a diverging beam. The objective lens 10 converges the incident beam onto the data recording surface 2b as if the light beam were incident on the rear principal plane S2' of objective lens 10. The magnification ratio of the relay lens 40 is substantially equal to 1.

In FIG. 10, solid lines P1 indicate the light path when the galvano mirror 26 is located at the standard position, while broken lines P2 indicate the light path when the parallel laser beam P inclines with respect to the optical axis O3 of the imaging lens 40 as the galvano mirror 26 rotate from the standard position.

The rotation center O1 of the galvano mirror 26 is substantially on the reflection surface of the galvano mirror 26, and on the central portion of the reflection surface, the laser beam P is incident. Further the portion on which the laser beam P is incident and the front principal point S1 of the objective lens 10 have a substantially conjugate relationship as described above. Therefore according to the fifth embodiment, the chromatic aberration can be adequately compensated.

The beam reflected on the data recording surface 2b is converged by the objective lens 10, reflected towards the galvano mirror 26 by the reflection mirror 31, and then deflected towards the composite prism assembly 21.

In the optical system 1005 shown in FIG. 10, the focal length of the imaging lens is 15 mm, and LaF81 is used as glass material. The focal length of the objective lens 10 is 1.23 mm, and NbFD82 is used as glass material.

[Sixth Embodiment]

Figure 11:
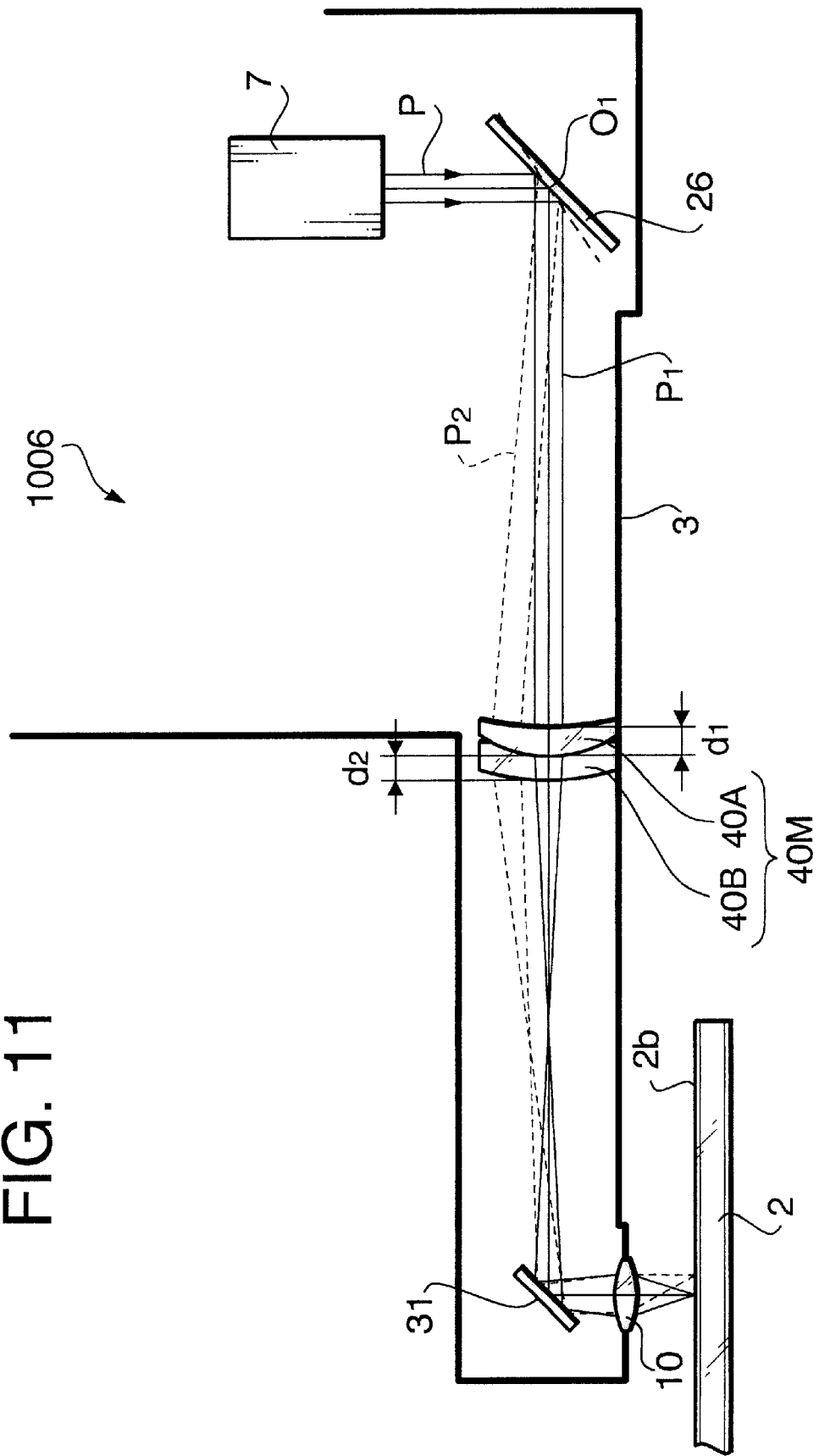
FIG. 11 shows an arrangement of optical elements of an optical system according to a sixth embodiment of the invention.

FIG. 11 shows an optical system 1006 according to a sixth embodiment of the invention. The sixth embodiment is similar to the fifth embodiment except that a relay lens 40M is used instead of the relay lens 40.

If the wavelength of the laser beam P emitted from laser diode 18 changes by 1 nanometer (nm), the focal length of objective lens 26 will change by 0.12 μm. That is, a chromatic aberration of 0.12 μm/nm will occur.

To compensate the chromatic aberration due to variation of the wavelength, according to the sixth embodiment, the relay lenses 40M is constituted as a cemented lens by adhering two lenses 40A and 40 as shown in FIG. 11.

Specifically, in the optical system 1006 shown in FIG. 11, the imaging lens 40M is constituted such that:

PSKO2 is used as glass material of the lens 40A;

SF7 is used as glass material of the lens 40B;

a focal length of the entire lens 29M is 15 mm;

R1=−16.2 mm;

R2=−0.89 mm;

R3=−5.6 mm;

d1=2.0 mm; and d2=1.0 mm, wherein R1 represents the radius of curvature of the galvano mirror side surface of the lens 40A, R2 represents the radius of curvature of the adhered surfaces of lenses 40A and 40B, R3 represents the radius of curvature of the objective lens side surface of the lens 40B, d1 indicates the thickness of the lens 40A along the optical axis thereof, and d2 indicates the thickness of the lens 40B along the optical axis of the lens 40B. Thus configured relay lens 40M is capable of compensating the chromatic aberration of the objective lens 10 to 0.06 μm/nm.

According to the sixth embodiment, it is ensured that center of the light intensity distribution of the laser beam intersects the front principal point of the objective lens even if the galvano mirror is rotated, and accordingly, the coupling efficiency will not be lowered even when a distance between the galvano mirror and the objective lens is made relatively long. Further, according to the sixth embodiment, chromatic aberration of the objective lens can be compensated.

[Seventh Embodiment]

Figure 12:
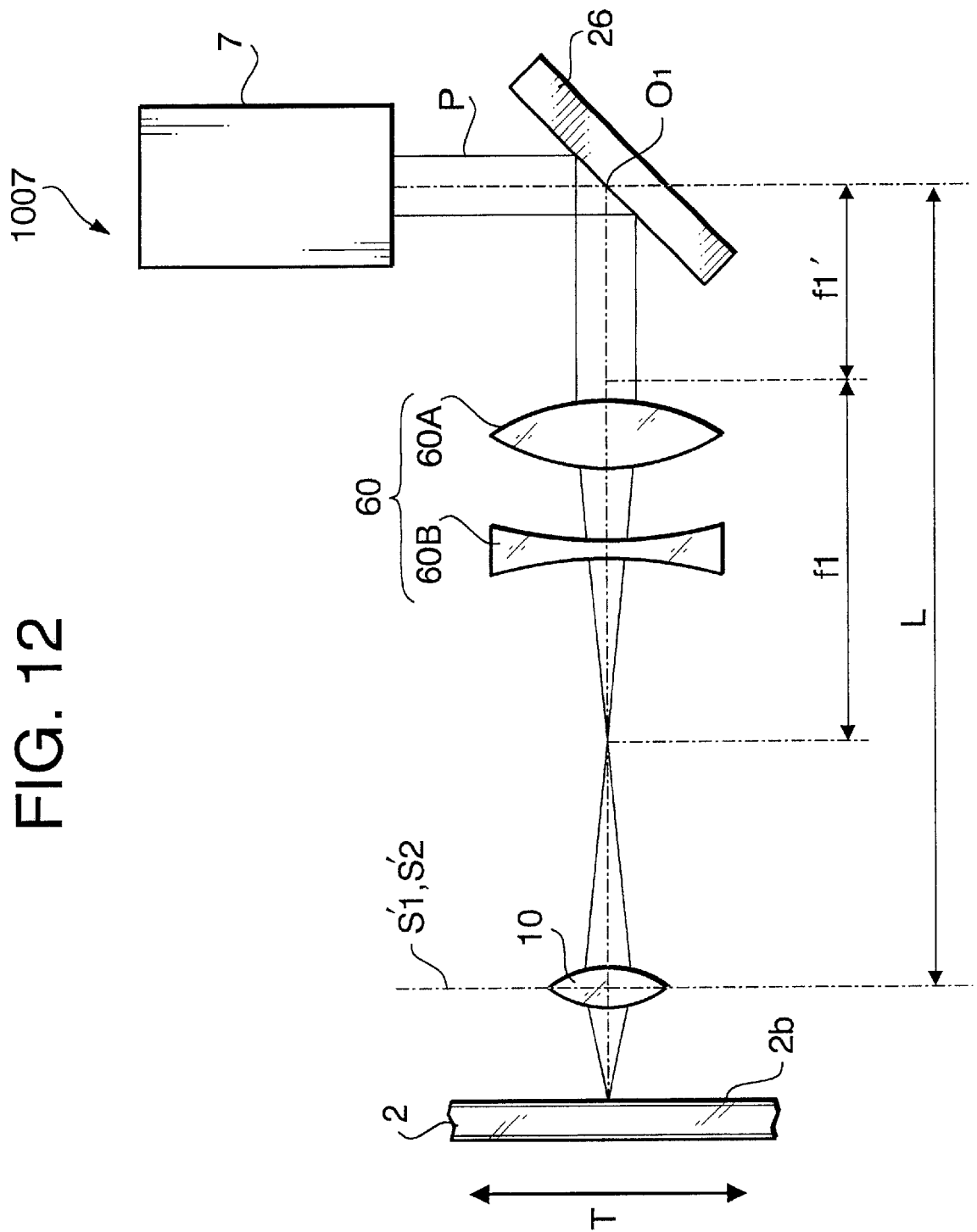
FIG. 12 shows an arrangement of optical elements of an optical system according to a seventh embodiment of the invention.

FIG. 12 shows an optical system 1007 according to a fifth embodiment of the invention.

In FIG. 12, the parallel beam P that has been emitted from the light source module 7 is incident on the galvano mirror 26, and is directed to the objective lens 10 via a relay lens system 60.

The objective lens 10 has a front principal plane S'1 and a rear principal plane S'2, and converges the beam, that is reflected by the galvano mirror 26 and passed through the relay lens 60, onto the data recording surface 2b of the optical disk 2 to form a light spot thereon. The distance L between the objective lens 10 (the front principal plane S'1) and the galvano mirror 26 (the rotation center thereof) is fixed.

The relay lens system 60 is provided between the rotation center O1 of the galvano mirror 26 and the objective lens 10 on the rotary arm 3 such that the vicinity of the reflection surface of the galvano mirror 26 and the front principal plane S'1 of the objective lens 10 have a conjugate relationship.

The relay lens system 60 forms the image of the central portion of the reflection surface of the galvano mirror 26 (i.e., intensity distribution of the beam on the galvano mirror 26) on the front principal plane S'1 of the objective lens 10. In this embodiment, the image magnification ratio of the relay lens system 60 is substantially equal to one.

Since the intensity distribution at the reflecting surface of the galvano mirror 26 is projected onto the front principal plane S'1 (i.e., the entrance pupil plane) of the objective lens 10 at magnification ratio of one, the light intensity distribution will be practically unchanged even when the galvano mirror 26 is rotated. The intensity distribution of the light spot that is converged on the data recording surface 2b of the optical disk 2 and the light spot size can therefore be kept in practically the same conditions as those when galvano mirror 26 is located at the standard position. Thus, the fine tracking using the galvano mirror 26 can be performed accurately, under these conditions.

In the optical system 1007 according to the seventh embodiment, the relay lens system 60 is constituted as a combination of a positive lens 60A and a negative lens 60B. In particular, the optical system 1007 is designed such that the positive lens 60A having a strong power is disposed on the galvano mirror 26 side, and the negative lens 60B is disposed within the beam converged by the positive lens 60A. With use of the relay lens system 60, the length of rotating arm 3 can thus be made shorter since the length of the optical system 1007 can be made shorter relative to an optical system having a single positive lens having the same focal length.

The combination of the positive lens and negative lens will be described with reference to FIG. 13.

Figure 13:
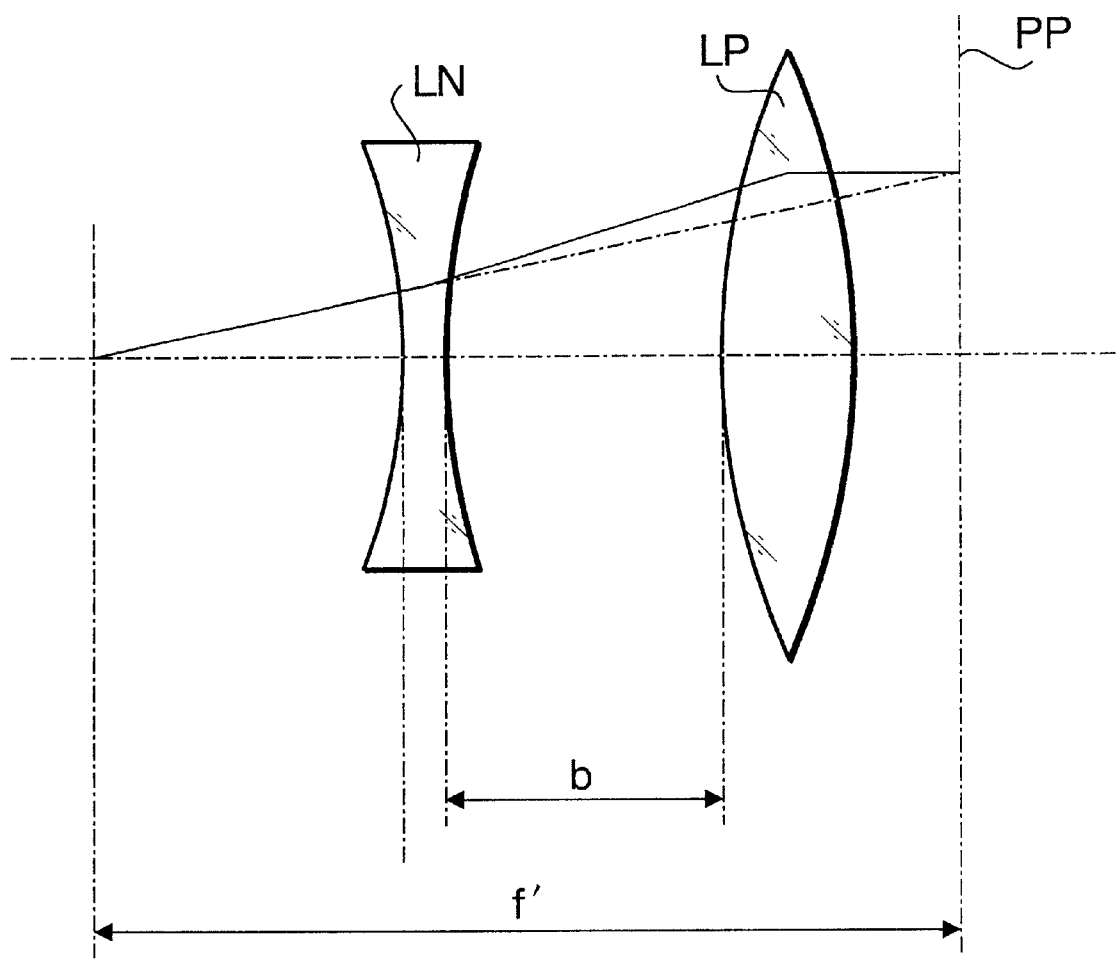
FIG. 13 shows an effect of a combination of a positive lens and a negative lens.

FIG. 13 shows a so-called telephoto type combination of positive lens LP whose focal length is Fp and negative lens LN whose focal length is Fm. In this drawing, a parallel beam is incident from the left-hand side of the drawing. If a distance d between the lenses is smaller than either of the focal lengths Fp and Fm of the positive lens and negative lens, and Fp<Fm, the effective focal length f of the entire lens system has a positive value, and accordingly, the lens system serves as a lens group having positive power. In this combination, the rear principal plane PP of the entire lens group is located on the parallel beam side (left-hand side in FIG. 14) of the positive lens LP, and therefore, the total length of the lens system is made shorter with respect to the focal length. Accordingly, by combining the positive and negative lenses LP and LN to form the telephoto type combination as shown in FIG. 14, the total length of the lens system can be made shorter without reducing the focal length of the lens system as a whole.

[Eighth Embodiment]

Figure 14:
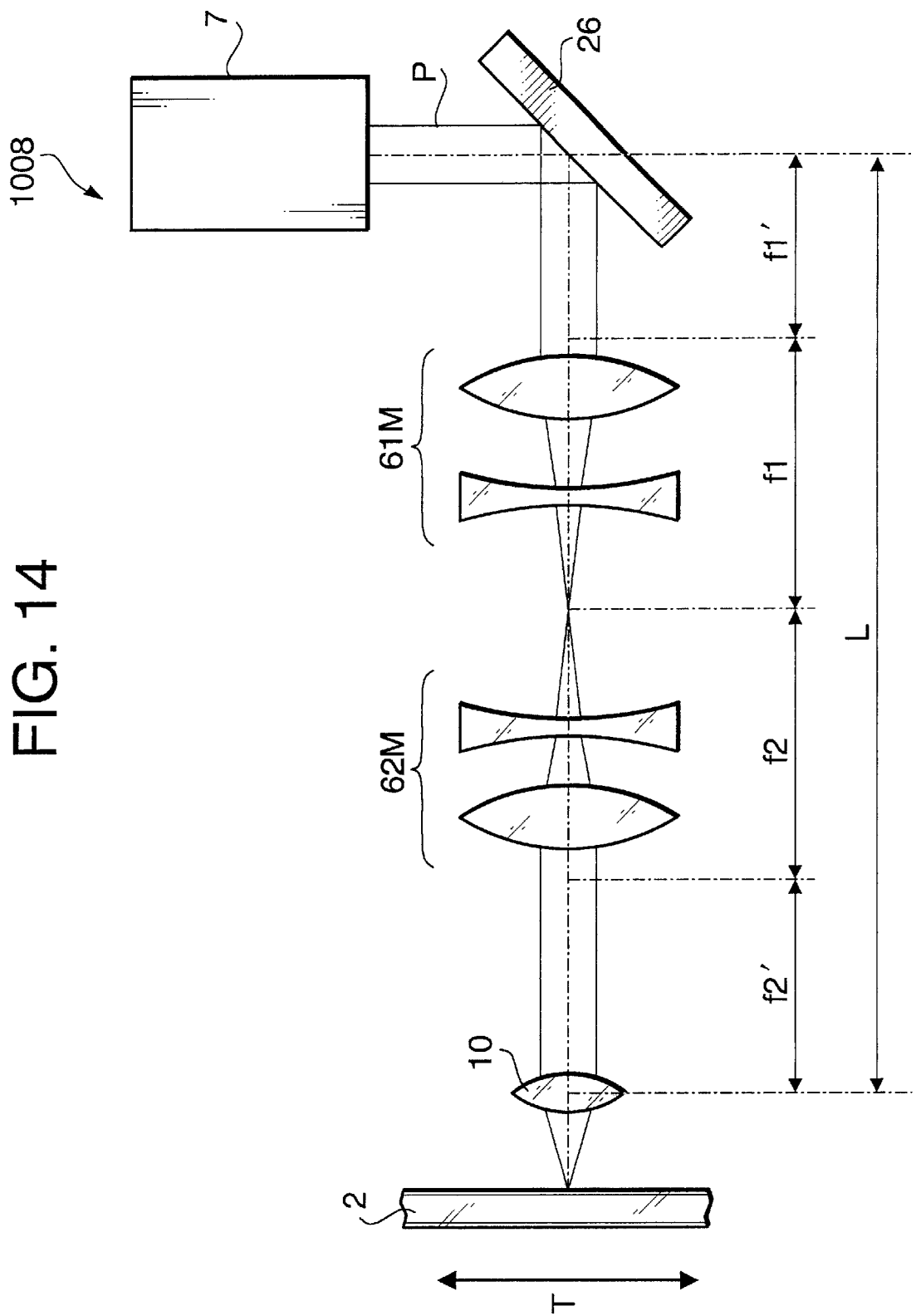
FIG. 14 shows an arrangement of optical elements of an optical system according to a eighth embodiment of the invention.

FIG. 14 shows an optical system 1008 according to a eighth embodiment of the invention.

In the optical system shown in FIG. 14, a first relay lens group 61M and a second relay lens group 62M are employed in place of the first relay lens 29 and second relay lens 30 of the first embodiment. The first and second relay lens groups 61M and 62M are telephoto type lenses, and respectively have combinations of positive and negative lenses. Similarly to the first embodiment, the conjugate relationship between the vicinity of the central portion of the reflection surface of the galvano mirror 26 and the front principal point of the objective lens 10 is maintained. By employing the telephoto type lens combination in each of the lens groups 61M and 62M, the length of the optical system 1008 (i.e., a distance between the objective lens 10 and the galvano mirror 26) is shortened, and accordingly the length of rotating arm 3 can be shortened.

Although both lens groups 61M and 62M are arranged as combinations of positive and negative lenses in this eighth embodiment, it is possible to constitute only one of the two lens groups 61M and 62M as the combined lens system, and the other as a single lens as employed in the first embodiment. Even in such a case, the length can be shortened in comparison to the case where two single positive lenses are used.

[Ninth Embodiment]

FIGS. 15–18 show an optical system 1009 according to a ninth embodiment of the invention.

In the disk drive 1, if the rotation axis of the galvano mirror 26 is tilted, the beam spot formed on the optical disk 2 may move in a direction tangential to a track as well as in a direction perpendicular to a track when the galvano mirror 26 is rotated. In such a case, a jitter components is included in the signal output by the sensors 24 and 25, resulting in deterioration of the quality of the output signal of the sensors 24 and 25.

The optical system 1009 is constituted to prevent the above-described condition.

Figure 15:
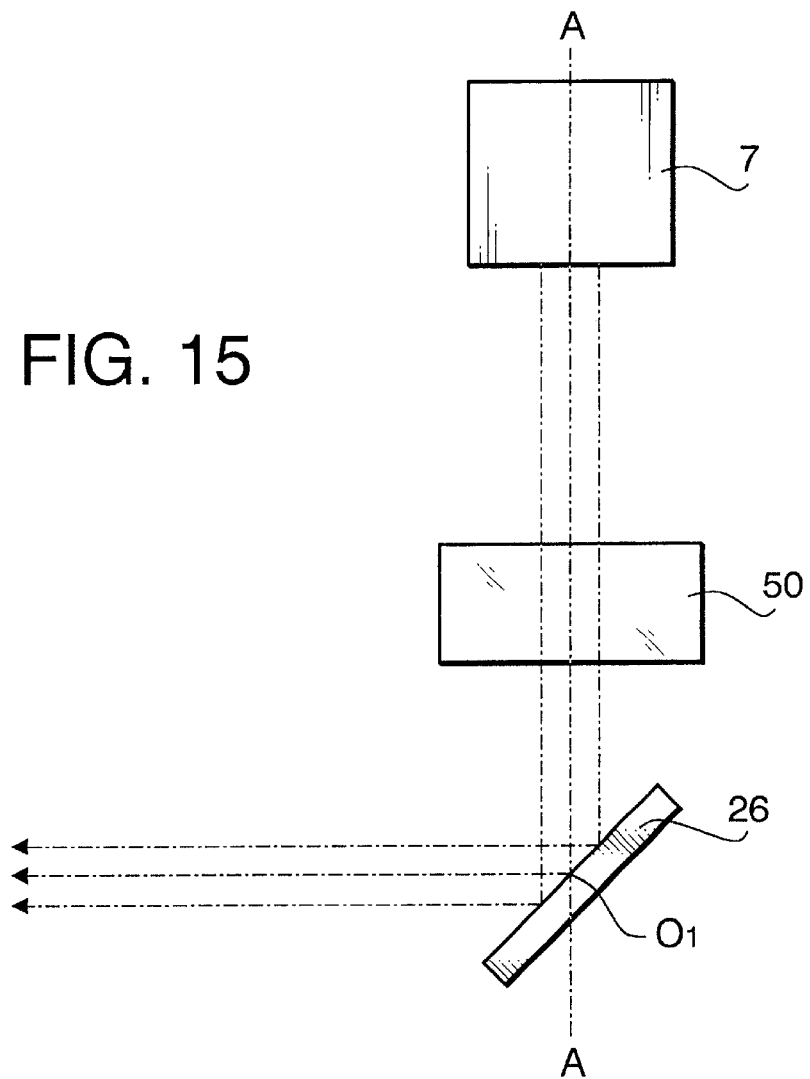
FIG. 15 shows the vicinity of the galvano mirror as viewed from the direction of the rotation axis of the galvano mirror.
Figure 16:
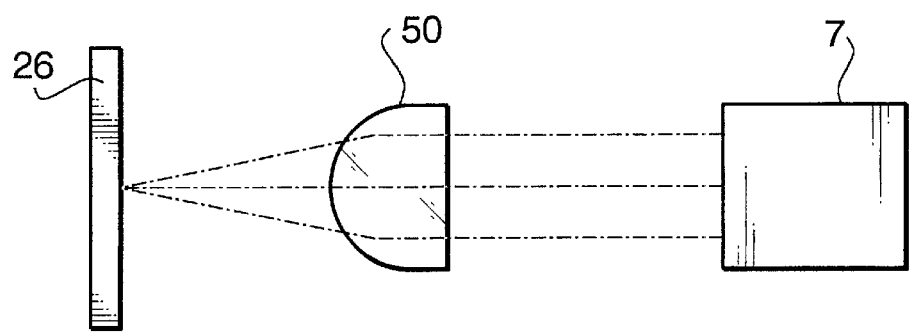
FIG. 16 is a sectional view of the vicinity of the galvano mirror taken along line A—A of FIG. 15.

FIG. 15 shows the vicinity of the galvano mirror 26 as viewed from the direction of the rotation axis of galvano mirror 26, and FIG. 16 is a sectional view of the vicinity of the galvano mirror 26 taken along line A—A of FIG. 15.

As shown in FIGS. 15 and 16, in the optical system 1007, a cylindrical lens 50 is inserted between the light source module 7 and the galvano mirror 26. The cylindrical lens 50 has power only in a direction of the rotation axis O1 of the galvano mirror 26, and is arranged to make the light beam having a substantially circular cross section emitted from the light source module 7 converge on the reflection surface of the galvano mirror 26 such that a line-like image extending in the direction orthogonal to the rotation axis of the galvano mirror 26 is formed on the reflection surface of the galvano mirror 26. Further, at least one surface of the relay lenses 29E and 30E is formed to have an anamorphic (toric) surface so that the line-like image formed on the reflection surface of the galvano mirror 26 is converted to a beam having the circular cross section. It is preferable that the toric surface is formed such that various types of aberrations are also compensated thereby, before the laser beam is incident on the objective lens 10.

Figure 17:
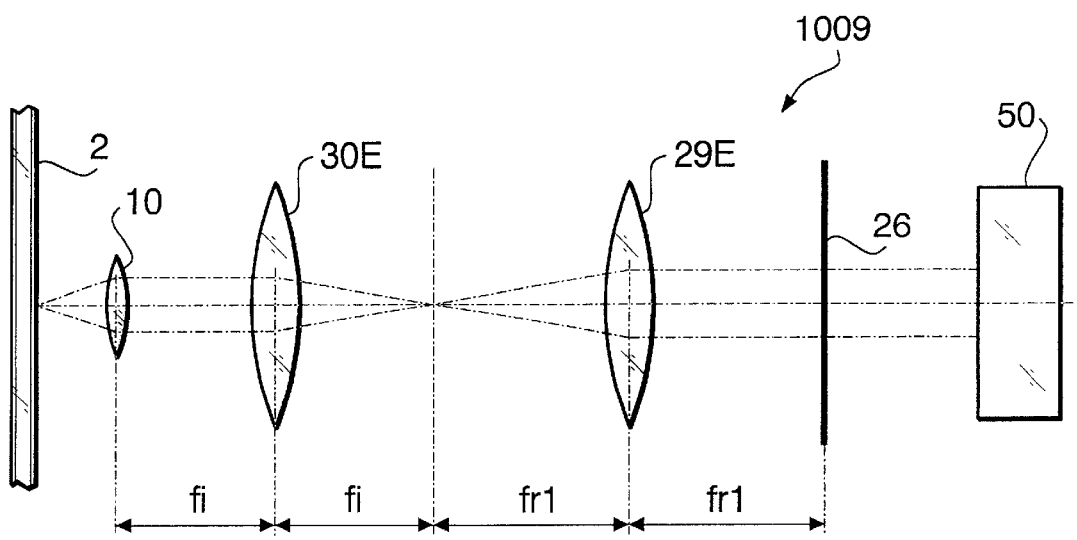
FIG. 17 shows an arrangement of optical elements of an optical system on a plane orthogonal to the rotation axis of the galvano mirror according to a ninth embodiment of the invention.
Figure 18:
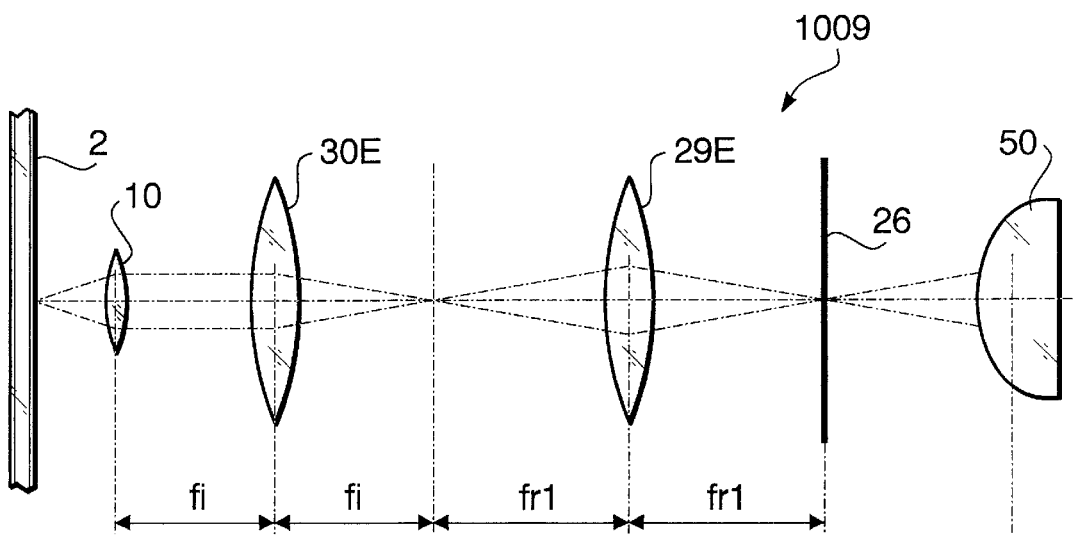
FIG. 18 shows an arrangement of optical elements of an optical system on a plane that contains the rotation axis of the galvano mirror according to the ninth embodiment of the invention.

For example, the first relay lens 29 of the first embodiment described above may be replaced with a toric lens 29E whose power in the direction of the rotation axis of the galvano mirror 26 differs from the power in the direction orthogonal to the rotation axis of the galvano mirror 26, as shown in FIGS. 17 and 18. In this case, the second relay lens 30E of the ninth embodiment is the same as the second relay lens 30 of the first embodiment. With this configuration, the laser beam is converged on the reflection surface of the galvano mirror 26 only in the direction of the rotation axis of the galvano mirror 26, and is converted to a light beam having the circular cross section before it is incident on the objective lens 10. Therefore, the influence of the tilting of the reflection surface of galvano mirror 26 can be avoided.

FIG. 17 shows the arrangement of the lenses on a plane orthogonal to the rotation axis of the galvano mirror 26, while FIG. 18 shows the arrangement of the lenses on a plane that includes the rotation axis of the galvano mirror 26. In order to simplify the drawings, the optical system is shown as developed, and the galvano mirror 26 is expressed as a line segment and the light beam incident on the galvano mirror 26 and the deflected light beam are shown to lie on the same plane.

If the focal length of the first relay lens 29E in FIG. 17 is fr1 and the focal length of the second relay lens 30E is fi, distances between the galvano mirror 26 and the first relay lens 29E, the first relay lens 29E and the second relay lens 30E, the second relay lens 30E and the objective lens 10 are fr1, fr1+fi, fi, respectively, as shown in the FIG. 17. In FIG. 17, the reflection surface of the galvano mirror 26 is coincident with the front focal point of the first relay lens 29E, and the rear focal point of the first relay lens 29E is coincident with the front focal point of the second relay lens 30E. Further, the rear focal point of the second relay lens 30E is on the front principal plane S'1 of the objective lens 10. In other words, the central portion of the reflection surface of the galvano mirror 26 and the principal point S1 of the objective lens 10 are in a substantially conjugate relationship.

In FIG. 18, the focal length of the first relay lens 29E on the plane including the rotation axis of the galvano mirror 26 is fr2, which is different from the focal length fr1 thereof on the plane orthogonal to the rotation axis of the galvano mirror 26 (see FIG. 17). The light beam converged, by the lens 50, onto the reflection surface of the galvano mirror 26 will be converged again at a position apart from the first relay lens 29E by a distance fr1 on the second relay lens 30E side (i.e., fr2=fr1/2). That is, in the plane containing the rotation axis of the galvano mirror 26, the rear focal point of the lens 50 coincides with the reflection surface of the galvano mirror 26, and the image formed on the reflection surface of the galvano mirror 26 is converged by the first relay lens 29E onto a position apart by fr1 on the second relay lens 30E side.

The focal length of the second relay lens 30E in FIG. 18 is fi, and thus the light beam converged by the first relay lens 29E is converted by second relay lens 30E to the parallel beam and is incident on the objective lens 10.

With the above arrangement, since the shape of the light beam on the reflecting surface of the deflection mirror is made into line-like shape extending in the direction orthogonal to the rotation axis of the galvano mirror 26, and then the line-like shape beam is converted back to the parallel beam which is incident on the objective lens 10, the light beam will not be affected by tilting of the reflection surface of the galvano mirror 26. Further, in a plane of FIG. 18, in a vicinity of the surface of the galvano mirror 26 and the data recording surface of the optical disk 2 have a conjugate relation ship. Accordingly, even if the galvano mirror 26 is tilted, a position of a beam spot formed on the optical disk 2 remains substantially the same.

As described above, with the arrangement according to the ninth embodiment, the influences of tilting of the reflection surface of the galvano mirror 26 can be avoided, the fine tracking executed by rotating the galvano mirror can be performed precisely. It should be noted that the above configuration to deal with the tilt of the reflection surface of the galvano mirror 26 can be applied to the other embodiments.

[Tenth Embodiment]

Figure 19:
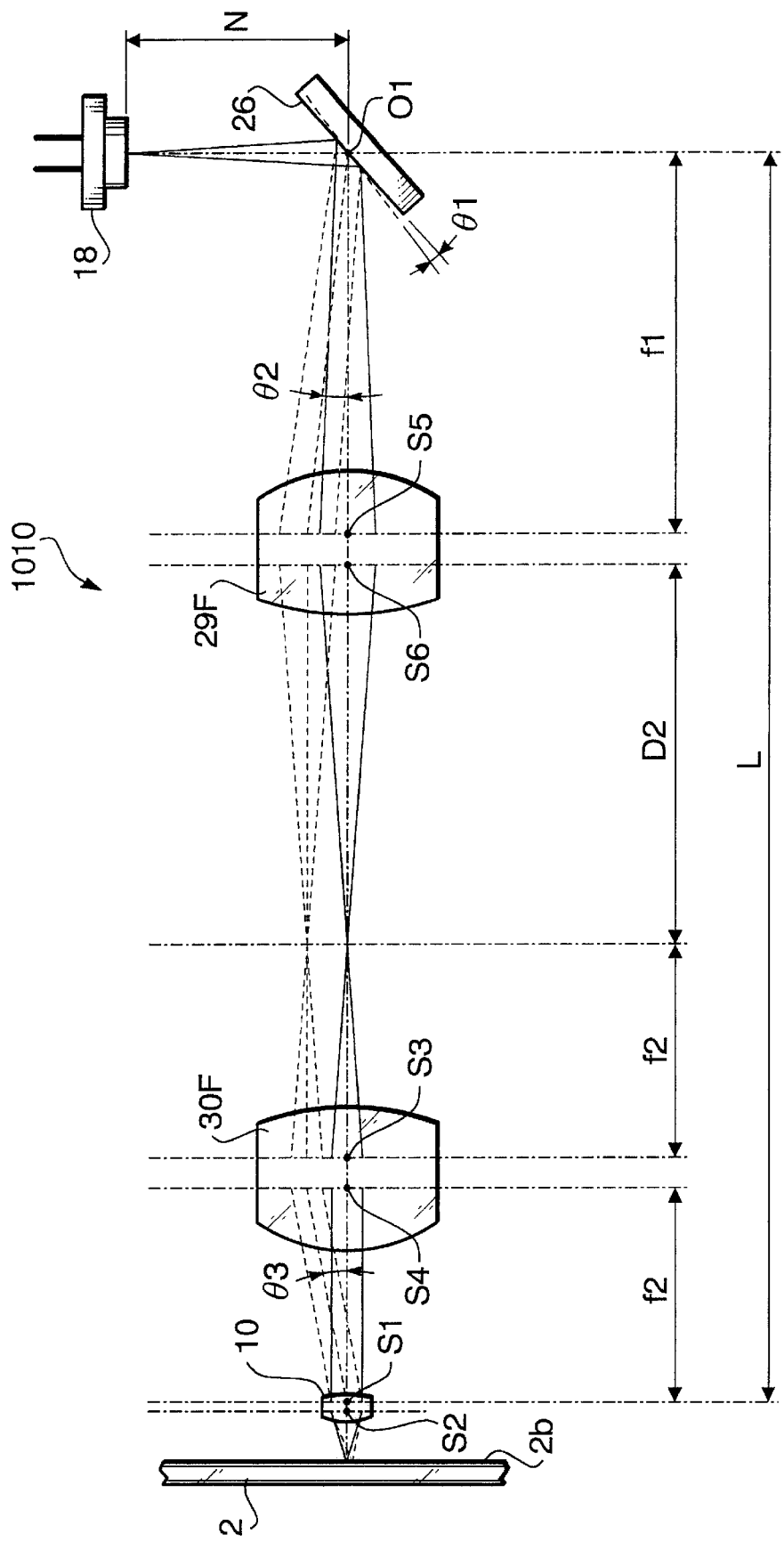
FIG. 19 shows an arrangement of optical elements of an optical system according to a tenth embodiment of the invention.

FIG. 19 shows an optical system 1010 according to a tenth embodiment of the invention.

In the optical system 1010, the light beam that has been emitted from semiconductor laser 18 is made incident on the galvano mirror 26 without making it pass through a collimator lens. In FIG. 19, the composite prism assembly 21 is omitted for simplifying the drawing and description.

The objective lens 10 has a front principal point S1 and a rear principal point S2 and converges the parallel light beam incident thereon onto the data recording surface 2b of the optical disk 2 to form a light spot. A distance L between the front principal plane S1 of the objective lens 10 and the galvano mirror 26 is fixed.

On rotating arm 3, first and second relay lenses 29F and 30F are disposed between the rotation center O1 of galvano mirror 26 and the objective lens 10. The focal length of the first relay lens 29F is f1 and the focal length of the second relay lens is f2 (f1>0, f2>0). The distance between the galvano mirror side principal plane S5 of the first relay lens 29F and the rotation center O1 of the galvano mirror is f1. Further, the distance between the objective lens side principal point S4 of the second relay lens 30F and the front principal point S1 of the objective lens 10 is f2. Furthermore, the position at which the laser beam from semiconductor laser 18 is converged by the first relay lens 29F coincides with the galvano mirror side focal point of the second relay lens 30F. The distance between the rear principal point S6 of the first relay lens 29F and the above-mentioned position at which the laser beam is converged will be referred to as D2. With this structure, the reflection surface of the galvano mirror 26 and the front principal point S1 have a conjugate relationship.

The movement angle θ2 of the light beam when galvano mirror 26 has been rotated by θ1 is expressed as θ2=2×θ1, and the rotation directions of θ1 and θ2 are the same. Here, the angle of incidence θ3 of the light beam that is made incident on objective lens 10 is expressed as θ3=θ2×f1/f2, θ3 and θ2 are opposite in direction.

Further, the distance between the objective lens side principal plane S6 of the first relay lens 29 and the galvano mirror side principal plane S3 of the second relay lens 30 is f2+D2, and D2>f1. When the optical distance from galvano mirror 26 and the point of emission of the laser diode 18 is N, the following relationship is satisfied:

$$1/(-D2)-1/(f1+N)=-1/f1$$

For example, if D2 is 1.5×f1, N becomes 2×f1.

By substituting D1 for (f1+N), the above formula can be modified as:

$$1/D1+1/D2=1/f1$$

That is, the following condition is satisfied by the optical system shown in FIG. 19:

$$1/f1=1/D1+1/D2.$$

Further, $$f1<D1$$

is satisfied since D1=f1+N.

The light beam reflected on the data recording surface 2b of the optical disk 2 is refracted via solid immersion lens 11 and objective lens 10, reflected towards the galvano mirror 26 by the reflection mirror 31, and made incident on the composite prism assembly 21 (not shown in FIG. 19).

Although the laser beam that is emitted from the laser diode 18 is made incident on the galvano mirror 26 without using the collimator lens in the embodiment described above, the laser beam emitted from the laser diode 18 can be made incident on the galvano mirror after being converged once by another lens. In such a case, the distance from the convergence point to the galvano mirror 26 should be referred to as the above-mentioned distance N.

According to the tenth embodiment described above, an optical system with which the intensity distribution of the laser beam on the magneto-optical disk does not vary greatly, and further the coupling efficiency between the objective optical system and the laser source will not be lowered.

The present disclosure relates to subject matters contained in Japanese Patent Applications Nos. HEI 09-170267, filed on Jun. 26, 1997, HEI 09-309856, filed on Oct. 24, 1997, HEI 09-309860, Oct. 24, 1997, HEI 09-309861, Oct. 24, 1997, HEI 09-317628, Nov. 4, 1997, HEI 09-318994, filed on Nov. 5, 1997, which are expressly incorporated herein by reference in their entireties.

What is claimed is:

1. An optical system of an optical disk drive that at least one of reads data from an optical disk and writes data to the optical disk, comprising:

a light source that emits a parallel laser beam;

a deflector that has a rotatable mirror surface, said parallel laser beam emitted by said light source being incident on said rotatable mirror surface, said parallel laser beam being deflected from said rotatable mirror surface;

an objective lens system that faces the optical disk; and a relay lens system provided between said deflector and said objective lens system, such that said rotatable mirror surface and a front principal plane of said objective lens system have a substantially conjugate relationship, wherein said relay lens system comprises a first relay lens group and a second relay lens group, said first relay lens group and said second relay lens group being arranged such that a front focal point of said first relay lens group is located in a vicinity of a central portion of said rotatable mirror surface on which said laser beam is incident, a rear focal point of said first relay lens group coinciding with a front focal point of said second relay lens group, and a rear focal point of said second relay lens group coincides with a front principal point of said objective lens system.

2. The optical recording system of claim 1, wherein a focal length of said first relay lens group is substantially equal to a focal length of said second relay lens group.

3. The optical recording system of claim 1, wherein a focal length of said first relay lens group is greater than a focal length of said second relay lens group.

4. The optical recording system of claim 1, wherein a focal length of said first relay lens group is less than a focal length of said second relay lens group.

5. The optical system of claim 1, wherein at least one of said first relay lens group and said second relay lens compensates a chromatic aberration of said objective lens.

6. The optical system of claim 5, wherein said at least one of said first relay lens group and said second relay lens group comprises a cemented lens in which a plurality of lenses are adhered with each other.

7. The optical system of claim 1, wherein at least one of said first relay lens group and said second relay lens group comprises a telephoto type lens system.

8. The optical system of claim 1, further comprising a cylindrical lens provided between said light source and said deflector, said cylindrical lens converging said diverging light on said rotatable reflection surface of said deflector in a direction parallel to a rotary axis of said deflector, so that a line-like image is formed on said rotatable reflection surface of said deflector, a parallel beam emerging from said relay lens system when said line-like image is reflected by said rotatable reflection surface of said deflector and is incident on said relay lens system.

9. The optical system of claim 8, wherein said first relay lens group has a power in a direction parallel to said rotary axis of said deflector that differs from a power in a direction perpendicular to said rotary axis of said deflector, said first relay lens group and said second relay lens group being arranged such that a beam reflected by said rotatable reflection surface of said deflector is converged at a front focal point of said second relay lens group, and that a rear focal point of said second relay lens group coincides with a front principal point of said objective lens.

10. The optical system according to claim 1, wherein said relay lens system further include an anamorphic lens surface.

11. An optical system of an optical disk drive that at least one of reads data from an optical disk and writes data comprising:

a light source that emits a diverging light from a light emitting point;

a deflector that has a rotatable mirror surface, said diverging light emitted by said light source being incident on said rotatable mirror surface and deflected therefrom;

an objective lens system that faces the optical disk; and a relay lens system provided between said deflector and said objective lens system, such that said rotatable mirror surface and a front principal plane of said objective lens system have a substantially conjugate relationship.

12. The optical system of claim 11, wherein said relay lens system comprises a first relay lens group and a second relay lens group which are arranged to satisfy the following relationship:

$$1/f1 = 1/D1 + 1/D2;$$

and $$f1 < D1,$$

wherein D1 is a distance between said light emitting point and a front principal point of said first lens group, f1 is a focal length of said first lens group, and D2 is a distance between a rear principal point of said first lens group and a front focal point of said second lens group.

13. An optical system of an optical disk drive that at least one of reads data from an optical disk and writes data to the optical disk, comprising:

a light source that emits a parallel beam of light;

a deflector that deflects said parallel beam of light towards the optical disk;

an objective lens system that faces the optical disk; and a relay lens system provided between said deflector and said objective lens system, said relay lens system comprising at least one positive lens group combined with at least one negative lens group, a principal plane position of said objective lens and a vicinity of a center of rotation of said deflector having a substantially conjugate relationship.

14. An optical system of an optical disk drive that at least one of reads data from an optical disk and writes data to the optical disk, comprising:

a light source that emits a parallel beam of light;

a deflector that deflects said parallel beam of light towards the optical disk;

an objective lens system that faces the optical disk; and a relay lens system provided between said deflector and said objective lens system, said relay lens system comprising at least one negative lens group combined with at least two positive lens groups, a principal plane position of said objective lens and a vicinity of a center of rotation of said deflector having a substantially conjugate relationship.

* * * * *